US012195047B2

(12) United States Patent
Purdy

(10) Patent No.: US 12,195,047 B2
(45) Date of Patent: Jan. 14, 2025

(54) DETERMINING OBJECT CHARACTERISTICS USING UNOBSTRUCTED SENSOR EMISSIONS

(71) Applicant: Zoox, Inc., Foster City, CA (US)

(72) Inventor: Scott M. Purdy, Lake Forest Park, WA (US)

(73) Assignee: Zoox, Inc., Foster City, CA (US)

( * ) Notice: Subject to any disclaimer, the term of this patent is extended or adjusted under 35 U.S.C. 154(b) by 51 days.

(21) Appl. No.: 17/405,865

(22) Filed: Aug. 18, 2021

(65) Prior Publication Data

US 2023/0059808 A1 Feb. 23, 2023

(51) Int. Cl.
*B60W 60/00* (2020.01)
*B60W 30/09* (2012.01)
*B60W 30/095* (2012.01)

(52) U.S. Cl.
CPC ........ *B60W 60/0027* (2020.02); *B60W 30/09* (2013.01); *B60W 30/0956* (2013.01);
(Continued)

(58) Field of Classification Search
None
See application file for complete search history.

(56) References Cited

U.S. PATENT DOCUMENTS 10,414,395 B1 * 9/2019 Sapp ..................... G08G 1/00
11,126,180 B1 9/2021 Kobilarov
(Continued)

FOREIGN PATENT DOCUMENTS

JP 2019168953 A 10/2019
JP 2020194309 A 12/2020
(Continued)

OTHER PUBLICATIONS

M. Bijelic, T. Gruber and W. Ritter, "A Benchmark for Lidar Sensors in Fog: Is Detection Breaking Down?," 2018 IEEE Intelligent Vehicles Symposium (IV), Changshu, China, 2018, pp. 760-767, doi: 10.1109/IVS.2018.8500543. (Year: 2018).*
(Continued)

*Primary Examiner* — Aniss Chad
*Assistant Examiner* — Jennifer M Anda
(74) *Attorney, Agent, or Firm* — Lee & Hayes, P.C.

(57) ABSTRACT

Techniques for determining occupancy using unobstructed sensor emissions. For instance, a vehicle may receive sensor data from one or more sensors. The sensor data may represent at least locations to points within an environment. Using the sensor data, the vehicle may determine areas within the environment that are obstructed by objects (e.g., locations where objects are located). The vehicle may also use the sensor data to determine areas within the environment that are unobstructed by objects (e.g., locations where objects are not located). In some examples, the vehicle determines the unobstructed areas as including areas that are between the vehicle and the identified objects. This is because sensor emissions from the sensor(s) passed through these areas and then reflected off of objects located farther distances from the vehicle. The vehicle may then generate a map indicating at least the obstructed areas and the unobstructed areas within the environment.

16 Claims, 9 Drawing Sheets

(52) U.S. Cl.
CPC ... *B60W 60/0015* (2020.02); *B60W 2554/402* (2020.02); *B60W 2554/4041* (2020.02); *B60W 2554/4048* (2020.02); *B60W 2554/805* (2020.02)

(56) References Cited

U.S. PATENT DOCUMENTS

| | | | |
|---|---|---|---|
| 2008/0170754 A1* | 7/2008 | Kawasaki | G06V 20/584 |
| | | | 382/104 |
| 2014/0081507 A1* | 3/2014 | Urmson | B60W 40/06 |
| | | | 701/28 |
| 2014/0368807 A1 | 12/2014 | Rogan | |
| 2017/0176641 A1* | 6/2017 | Zhu | G05D 1/0088 |
| 2017/0371338 A1 | 12/2017 | Kamata et al. | |
| 2018/0143298 A1* | 5/2018 | Newman | B60W 30/0956 |
| 2019/0018421 A1 | 1/2019 | Frazzoli et al. | |
| 2019/0025433 A1* | 1/2019 | Yang | G01S 17/93 |
| 2019/0340775 A1* | 11/2019 | Lee | G05D 1/024 |
| 2019/0384302 A1* | 12/2019 | Silva | G06T 7/10 |
| 2019/0384309 A1 | 12/2019 | Silva et al. | |
| 2020/0202107 A1* | 6/2020 | Ozkucur | G01S 7/4808 |
| 2020/0225669 A1 | 7/2020 | Silva | |
| 2020/0300748 A1 | 9/2020 | Bremer | |
| 2021/0109523 A1 | 4/2021 | Ming | |
| 2021/0339738 A1* | 11/2021 | Lashkari | G01S 17/86 |
| 2021/0341293 A1 | 11/2021 | Schack | |
| 2022/0003871 A1* | 1/2022 | Troeger | G01N 15/0205 |
| 2022/0187448 A1* | 6/2022 | Shand | G01S 13/931 |
| 2022/0242403 A1 | 8/2022 | Horita | |
| 2023/0034208 A1* | 2/2023 | Kuroda | G01S 7/4808 |
| 2023/0058731 A1 | 2/2023 | Purdy | |
| 2023/0177818 A1 | 6/2023 | Kaithakauzha | |

FOREIGN PATENT DOCUMENTS

| | | |
|---|---|---|
| WO | WO2019212811 A1 | 11/2019 |
| WO | WO2020078727 A1 | 4/2020 |

OTHER PUBLICATIONS

The PCT Search Report and Written Opinion mailed Nov. 22, 2022 for PCT application No. PCT/US2022/039708, 11 pages.

Office Action for U.S. Appl. No. 17/405,826, mailed on Dec. 21, 2023, Scott M. Purdy, "Determining Occupancy Using Unobstructed Sensor Emissions", 35 pages.

Office Action for U.S. Appl. No. 17/405,826, mailed on Jul. 1, 2024, Purdy, "Determining Occupancy Using Unobstructed Sensor Emissions", 44 pages.

Office Action for U.S. Appl. No. 17/405,826, dated Oct. 24, 2024, 53 pages.

* cited by examiner

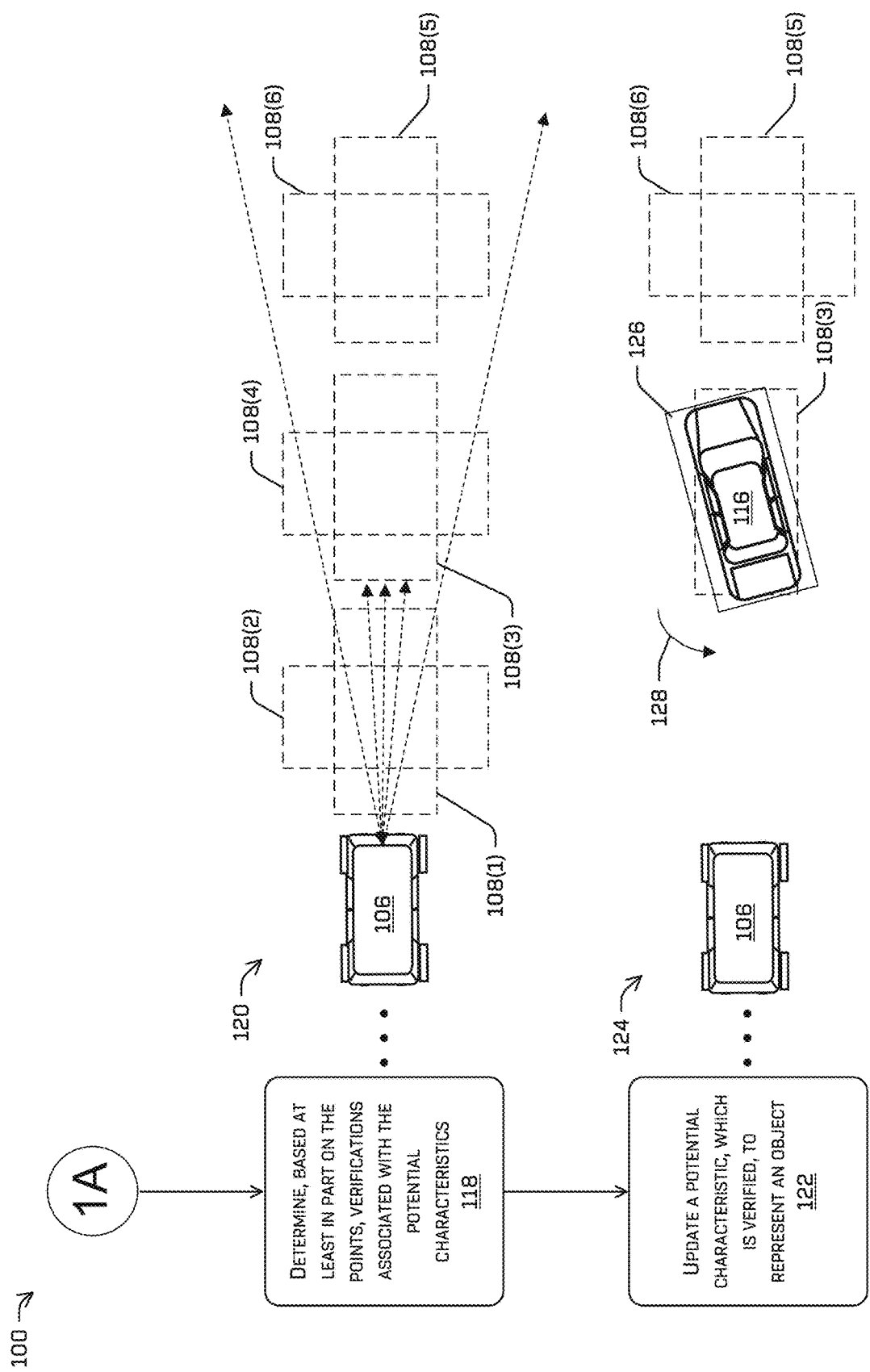

DETERMINING OBJECT CHARACTERISTICS USING UNOBSTRUCTED SENSOR EMISSIONS

BACKGROUND

An autonomous vehicle may be configured to navigate along a path from a starting location to a destination location. For example, when providing a ride to a passenger, the autonomous vehicle may pick the passenger up at the starting location and drop the passenger off at the destination location. While navigating, it is important for the autonomous vehicle to determine the locations of objects, such as other vehicles. For example, the autonomous vehicle may analyze sensor data in order to determine that another vehicle is located along the path of the autonomous vehicle. Because the other vehicle is located along the path, the autonomous vehicle may take one or more actions in order to safely avoid the other vehicle.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

FIGS. 1A-1B are a pictorial flow diagram of an example process for determining an occupancy using unobstructed sensor data.

DETAILED DESCRIPTION

Figure 1A:
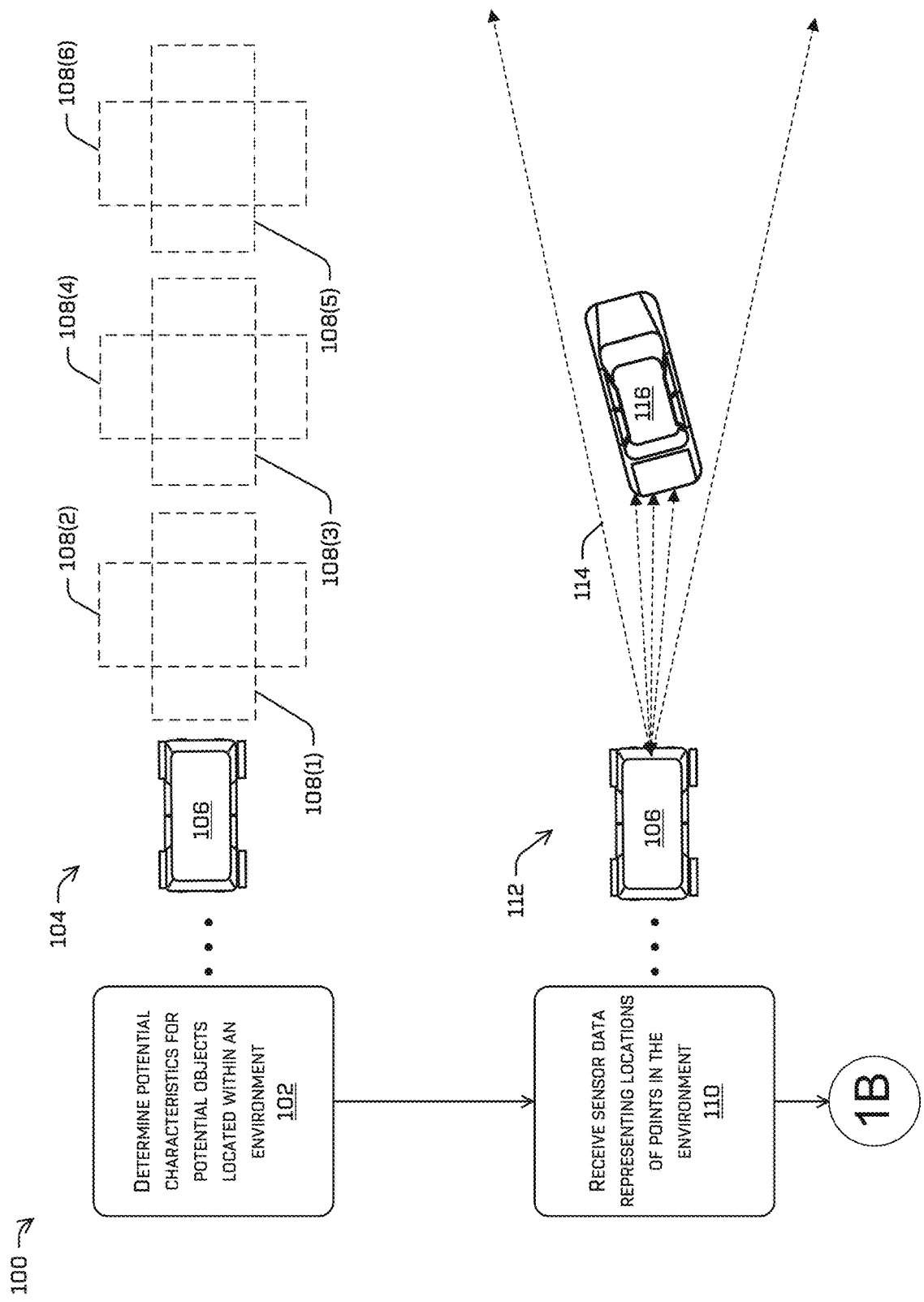

As discussed above, an autonomous vehicle may be configured to navigate along a path from a starting location to a destination location. For example, when providing a ride to a passenger, the autonomous vehicle may pick the passenger up at the starting location and drop the passenger off at the destination location. While navigating, it is important for the autonomous vehicle to determine the locations of objects, such as other vehicles. For example, the autonomous vehicle may analyze sensor data in order to determine that another vehicle is located along the path of the autonomous vehicle. Because the other vehicle is located along the path, the autonomous vehicle may take one or more actions in order to safely avoid the other vehicle. In some circumstances, the one or more actions may include navigating to an area that is unobstructed by any other object.

As such, the present application relates to techniques for determining occupancy of an environment in which the vehicle is operating using unobstructed sensor emissions. For instance, a vehicle may receive sensor data, such as lidar data, representing an environment in which the vehicle is navigating. The vehicle may then use the sensor data in order to determine distances to objects located within the environment. Using the distances, the vehicle may determine (1) areas of the environment that are obstructed by objects (referred to, in some examples, as "obstructed areas"), (2) areas of the environment that are unobstructed by objects (referred to, in some examples, as "unobstructed areas"), and/or characteristics associated with the objects. For example, and using the distances, the vehicle may determine that areas of the environment that are located between the vehicle and the objects are unobstructed by any other object. The vehicle may then generate a heatmap (and/or other type of map) that represents the obstructed areas within the environment and the unobstructed areas within the heatmap. In some examples, the heatmap represents likelihoods that the areas are obstructed or unobstructed. Using the heatmap, the vehicle may determine one or more actions for how to navigate through the environment.

In some examples, the vehicle may include one or more sensors from which the vehicle receives sensor data representing the environment in which the vehicle is located. Additionally or alternatively, the vehicle may receive sensor data from one or more sensors located remote from the vehicle (e.g., sensors of over vehicles, traffic cameras, sensors located on traffic signals or other objects in the environment, etc.). The one or more sensors may include, but are not limited to, lidar sensor(s), radar sensor(s), camera(s), and/or any other type of sensor. In some examples, such as when the sensor data includes lidar data, the sensor data may represent at least locations (e.g., the x-coordinates, y-coordinates, z-coordinates, distances, etc.) of points within the environment. Additionally, or alternatively, in some examples, the vehicle may analyze the sensor data using one or more techniques in order to determine the locations of the points within the environment. In such examples, the vehicle may use the sensor data to determine an occupancy associated with locations within the environment.

For instance, the vehicle may analyze the sensor data in order to group points for different objects based on object classifications. For example, the vehicle may determine that a first group of the points, as represented by the sensor data, is associated with a first object, such as another vehicle. Additionally, the vehicle may determine that a second group of the points, as represented by the sensor data, is associated with a second object, such as a pedestrian. The vehicle may then determine the locations of the objects within the environment using the groups of points. For example, the vehicle may use the locations associated with the first group of points in order to determine an area of the environment at which the first object is located. Additionally, the vehicle may use the locations associated with the second group of points in order to determine an area of the environment at which the second object is located. Each of these areas may be determined to be obstructed areas within the environment. As described herein, an obstructed area of the environment may include an area at which an object is located such that the vehicle cannot navigate through the area.

The vehicle may also use the sensor data (e.g., locations of the points within the environment) in order to verify areas of the environment that are unobstructed by any object. As described herein, an unobstructed area of the environment can include an area at which an object is not located and/or an area that the vehicle is able to navigate (based on the object classification, which is described in more detail below). In some examples, the vehicle determines that areas that are located between the vehicle and identified objects include the unobstructed areas within the environment. In some examples, when identifying these unobstructed areas, the vehicle may determine these unobstructed areas in three-dimensional space such that various elevations(s) within the area are unobstructed. For example, if the vehicle identifies an object, such as a street sign, that is located five meters above a roadway without any other object located beneath the street sign, then the unobstructed area may include the area underneath the street sign.

As described herein, when determining areas in three-dimensional space, the areas may be defined in voxel space. For example, the vehicle may generate the sensor data as the vehicle travels through the environment and then associate the sensor data with a voxel space. A voxel space may represent a volume of space within the environment. For example, a voxel space may represent a volume that is 100 meters (m)×100 m×100 m. Examples of defining areas in three-dimensional space are described in application Ser. No. 16/420,090, titled "Multiresolution Voxel Space" and filed May 22, 2019, the entire contents of which are incorporated herein.

For an example of identifying an unobstructed area, such as when the sensor data includes lidar data, the lidar sensor may emit pulses of light (also referred to as "sensor emissions") that reflect off of objects within the environment and back to the lidar sensor. The lidar sensor then analyzes the reflected light in order to determine the locations of the points from which the light reflected. In some examples, the lidar sensor determines the locations of the points using one or more techniques, such as the time it takes for the light to return back to the lidar sensor. As such, since a pulse of light may reflect off of an object and back to the light sensor, the vehicle may infer that no other object(s) are located between the lidar sensor emitter (e.g., located on an autonomous vehicle) and the object. In other words, the vehicle may determine that a distance between the vehicle and a point includes an unobstructed area as a result of the vehicle receiving the point from an object behind the unobstructed area. Additionally, in some examples, the vehicle may make the determination in 3-dimensional space using the angle at which the point is located with respect to the lidar sensor.

In some examples, when performing these processes to determine the occupancy of various locations within the environment, the vehicle may initially hypothesize locations for potential objects within the environment. In some examples, the vehicle initially hypothesizes potential objects located at various locations around the vehicle. Additionally, or alternatively, in some examples, the vehicle initially hypothesizes potential objects located on driving surfaces around the vehicle. For example, if the vehicle is parked in a parking lot, the vehicle may hypothesize that a first potential vehicle may be located a first distance to a first side of the vehicle, a second potential vehicle may be located a second distance to a second side of the vehicle, a third potential vehicle may located a third distance to a third side of the vehicle, and a fourth potential vehicle may be located a fourth distance to a fourth side of the vehicle.

Additionally, in some examples, the vehicle may hypothesize additional characteristics associated with the objects. For example, the vehicle may use the type of environment to hypothesize the types of objects located within the environment. For instance, the vehicle may hypothesize that other objects located in a first type of environment (e.g., drivable surfaces, such as roadways, driveways, and/or the like) include first types of object(s) (e.g., other vehicle(s), bikes, etc.), hypothesize that other objects located on a second type of environment (e.g., non-drivable surfaces, such as sidewalks, yards, etc.) include second types of object(s) (e.g., pedestrians, bikes, street signs, etc.), and/or so forth. This way, the vehicle is able to better hypothesize locations of actual objects within the environment.

For another example, the vehicle may hypothesize the orientations of the other objects within the environment. For instance, if the vehicle is hypothesizing the location of another vehicle along a roadway, the vehicle may hypothesize orientations of the other vehicle along the roadway. In some examples, the vehicle hypothesizes the orientations based on the roadway, such that the other vehicle is oriented in the driving direction along the roadway. In any of these examples above, the vehicle may then perform the processes above in order to verify whether actual objects are located at one or more of the hypothesized locations.

For example, and using the example above where the vehicle hypothesizes that the first potential vehicle is located the first distance to the first side of the vehicle, the vehicle may analyze the sensor data and, based on the analysis, determine that point(s) emitted to the first side of the vehicle are being reflected off of object(s) that are located a fifth distance from the vehicle. The vehicle may then determine that the fifth distance is greater than the first distance. As such, the vehicle may determine that the area located to the first side of the vehicle that is between the vehicle and the fifth distance is unobstructed by an object. Because of this, the vehicle may determine that the hypothesis that the first potential vehicle is located the first distance to the first side of the vehicle was inaccurate.

For another example, and using the example above where the vehicle hypothesizes that the second potential vehicle is located the second distance to the second side of the vehicle, the vehicle may analyze the sensor data and, based on the analysis, determine that point(s) emitted to the second side of the vehicle are being reflected off of object(s) that are located a sixth distance from the vehicle. The vehicle may then determine that the sixth distance is the same or similar (e.g., within a threshold distance) to the second distance. As such, the vehicle may determine that the hypothesis that the second potential vehicle is located at the second distance to the second side of the vehicle was accurate. In other words, the vehicle may initially hypothesize characteristics (e.g., locations, types, orientations, etc.) for objects within the environment and then use the sensor data to determine whether the hypotheses are accurate (an object is actually located at the location, the object includes the type, the object includes the orientation, etc.) or inaccurate (an object is not actually located at the location, the object does not include the type, the object does not include the orientation, etc.).

In some examples, the vehicle may use the sensor data in order to determine characteristics associated with objects identified within the environment. For example, such as when an object that is located proximate to the vehicle includes a transparent object (e.g., smoke, fog, exhaust, etc.), the sensor data may represent both first points associated with the object (e.g., sensor emission(s) that reflected off of the object) as well as second points associated with other object(s) (e.g., sensor emission(s) that reflected off of other object(s)) that are located farther from the vehicle than the object. As such, the first points may indicate that the object is located approximately a first distance from the vehicle, but the second points may indicate that no object is located between the vehicle and a second point at a second distance, farther than the first distance. Because of this, the vehicle may use the first points and the second points to determine a classification for the object.

In some examples, the vehicle makes the determination based on the percentage of first points as compared to the percentage of the second points. For example, a first type of object, such as fog, may reflect a first percentage of the sensor emissions while a second type of object, such as exhaust, may reflect a second percentage of the sensor emissions. As such, based on the percentage of the first points and the percentage of the second points, the vehicle may determine whether the object is the first type of object or the second type of object. Additionally, or alternatively, in some examples, the vehicle can make the determination of the type of object based on the locations of the first points as compared to the locations of the second points. For example, if the object includes another vehicle, sensor emissions that hit the trunk of the other vehicle may reflect off of the other vehicle and back to the sensor(s) while sensor emissions that hit a window of the other vehicle may travel through the window and reflect off of another objected located on the other side of the other vehicle. As such, the vehicle may be able to analyze the sensor data in order to determine that the object has the shape of another vehicle (e.g., the second points represent the window of the other vehicle while the first points represent at least the trunk of the other vehicle).

Additionally, in some examples, the vehicle may determine an orientation of the object using at least the sensor data. For example, the sensor data may again represent first points associated with an object that is located a first distance from the vehicle and second points associated with object(s) that are located second, farther distance(s) from the vehicle. As such, the vehicle may analyze the sensor data in order to determine dimension(s) of the object, such as a length, width, and/or height of the object. Using the dimension(s), the vehicle may then determine the orientation of the object. For example, if the vehicle determines that the other object is another vehicle, the vehicle may determine an orientation of the other vehicle based on the length and/or width of the other vehicle as determined using the sensor data. For instance, the vehicle may determine that the other vehicle has a first orientation (e.g., the other vehicle is oriented such that the front or the back of the other vehicle is directed towards the vehicle) when the width is a first width and determine that the other vehicle includes a second orientation (e.g., the other vehicle is oriented such that a side of the other vehicle is directed towards the vehicle) when the width is a second, larger width.

In some examples, the vehicle may use one or more components (e.g., models, algorithms, and/or machine learning algorithms) when performing the processes described herein. For example, a first component may be trained and configured to analyze data in order to identify sensor emissions that include paths that pass in proximity to an object, but without reflecting off of the object. The data input into the first component may include, but is not limited to, sensor data representing point(s) associated with the object (e.g., points that reflected off of the object), data representing a location of a sensor that output the sensor emissions (e.g., a x-coordinate, y-coordinate, and z-coordinate of the sensor within the environment, a location of the sensor on the vehicle, etc.), information about the rotation of the sensor (e.g., such as the speed of rotation when the sensor includes a lidar sensor), sensor data representing point(s) that reflected farther away from the vehicle than the object (e.g., point(s) that reflected off object(s) that are farther than the object from the vehicle), and/or the like. The output from the first model may then include data representing the sensor emissions that passed in proximity to the object, but without reflecting off of the object. In some examples, the output data may further represent the proximity of the sensor emission to the object.

For another example, a second component may be trained and configured to analyze data in order to determine the type of object. The data may include, but is not limited to, sensor data representing first point(s) that reflected off of the object, sensor data representing second points that include sensor emissions that passed through the object, data representing a percentage of the sensor emissions that reflected off of the object, data representing a percentage of the sensor emissions that passed through the object, and/or the like. The second component may then analyze the inputted data and, based on the analysis, output data representing the type of object and/or the location of the object, using one or more of the processes described herein. For example, the second component may analyze the percentage of sensor emissions that reflected off of the object and the percentage of sensor emissions that passed through the object, using one or more of the processes described above, in order to determine the type of object. The second component may then output the data representing the type of object and/or an indicator, such as a bounding box, that represents the location of the object within the environment.

For another example, a third component may be trained and configured to analyze data in order to determine the orientations of objects. The data may include, but is not limited to, sensor data representing points associated with the object, data representing the sensor emissions that passed in proximity to the object without reflecting off of the object (e.g., which may be determined using the first component), sensor data representing point(s) that reflected farther away from the vehicle than the object (e.g., point(s) that reflected off object(s) that are farther than the object from the vehicle), and/or the like. The third component may then analyze the inputted data and, based on the analysis, output data representing the orientation of the object. For example, the third component may analyze the points associated with the object along with the sensor emissions that passed in proximity to the object without reflecting off of the object, using one or more of the processes described above, in order to determine the orientation of the object. The third component may then output data representing the orientation of the object. In some examples, the output data may include an indicator, such as a bounding box, that represent the object in the orientation determined by the third component.

Still, for another example, a fourth component may be trained and configured to analyze data in order to verify whether an area of the environment is obstructed and/or unobstructed by hypothetical objects. The data may include, but is not limited to, data representing positions of hypothetical objects at an area, sensor data representing points that reflected off of a real object at the area (if such points exist), data representing sensor emissions that passed through the area without reflecting off of a real object (also, if such points exist), sensor data representing point(s) that reflected off of object(s) that are farther from the vehicle than the area and include a direction that is substantially towards the area (which may be associated with the sensor emissions that passed through the area), and/or the like. The fourth component may then analyze the inputted data and, based on the analysis, output data representing whether the area is in fact obstructed by a real object (e.g., whether at least one of the hypothetical objects is located at the area) or unobstructed (e.g., that none of the hypothetical objects are located at the area). For example, the fourth component may analyze any points that reflected off of a real object within the area as well as any sensor emissions that passed through the area without reflecting off of an object, using one or more of the processes described herein, to determine whether the area is obstructed or unobstructed. The fourth component may then output data representing whether the area is obstructed, an indicator (e.g., a bounding box) representing the location of a real object within the area when the area is obstructed, or whether the area is unobstructed. While these are just a couple example components that the vehicle may use to perform processes described herein, in other examples, the vehicle may use additional and/or alternative components to perform one or more of the processes described herein.

In some examples, the vehicle may generate a map that represents the occupancy of the environment. For example, the map may represent the locations of obstructed areas within the environment and/or locations of unobstructed areas within the environment. Additionally, in some examples, the map may further indicate characteristics associated with the objects, such as classifications of the objects (e.g., object types), orientations of the objects, dimensions of the objects, and/or the like. The vehicle may then use the map when navigating around the environment. For example, the vehicle may use the map such that the vehicle does not collide with the identified objects and/or only navigates through unobstructed areas.

By performing the processes described herein, the vehicle is able to both determine the locations of objects within the environment and verify the locations of unobstructed areas within the environment using the sensor data. As described herein, the vehicle is able to verify the locations of the unobstructed areas using unobstructed portions of sensor emissions. For example, the vehicle is able to verify that area(s) between the vehicle and point(s) represented by the sensor data include unobstructed area(s) of the environment. By verifying the unobstructed areas within the environment, the vehicle may generate a map that more accurately depicts the environment in which the vehicle is navigating. This may increase the safety for the vehicle while navigating, as the vehicle is better able to avoid collisions with other objects.

For instance, and in some examples, the vehicle initially hypothesizes locations at which objects may be located within the environment. The vehicle then uses the sensor data to verify whether an actual object is located at each of the locations. This way, the vehicle is also able to verify locations within the environment which are unobstructed by actual objects. In other words, the vehicle may assume that an object is at a location before the vehicle verifies that the object is actually not located at the location. This may increase the overall safety for the vehicle when navigating around the environment.

As described herein, a sensor may emit sensor emissions (e.g., light pulses, etc.) at various directions within an environment. These sensor emissions may then travel through the environment until contacting objects within the environment, where the sensor emissions are then reflected back towards the sensor of the vehicle. For example, a sensor emission that is emitted by a lidar sensor may travel through the environment until reflecting off of another vehicle and then back towards the lidar sensor. The vehicle and/or the sensor may then analyze the reflected sensor emission in order to determine information associated with the sensor emissions. The information associated with a sensor emission may include, but is not limited to, the location of the point of reflection (e.g., an x-position (global position), a y-position (global position), a z-position (global position)), a direction associated with the sensor emission (e.g. an x-angle, a y-angle, a z-angle), a confidence level associated with the sensor emission, a classification associated with an object that the sensor emission reflected off (e.g., an object type), and/or any other type of information. In some examples, the vehicle and/or the sensor is able to generate the information using at least the direction associated with the sensor emission and the time it took for the sensor emission to be reflected off of the object and back to the sensor.

Additionally, as described herein, a first sensor emission may be within proximity to a second sensor emission (and/or pass within a proximity to a point associated with the second sensor emission) based on a first direction associated with the first sensor emission being within a threshold angle to a second direction associated with the second sensor emission. In some examples, such as when the vehicle is analyzing the sensor data in two-dimensional space, the threshold angle may include, but is not limited to, 0.1 degrees, 0.5 degrees, 1 degree, 2 degrees, and/or any other angle. Additionally, in some examples, such as when the vehicle is analyzing the sensor data in three-dimensional space, the threshold angle may include, but is not limited to, 0.1 degrees in given direction(s), 0.5 degrees in given direction(s), 1 degree in given direction(s), 2 degrees in given direction(s), and/or the like. For example, the vehicle may determine that a first sensor emission is proximate to a second sensor emission when the first direction is within 1 degree in the x-direction, 1 degree in the y-direction, and 1 degree in the z-direction. While this example includes the same threshold angle in each direction, in other examples, one or more of the directions may include a unique threshold angle.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In another example, the techniques may be utilized in an aviation or nautical context, or in any system evaluating distances between reference points in an environment (e.g., in a system using route-relative planning). Additionally, the techniques described herein may be used with real data (e.g., captured using sensor(s)), simulated data (e.g., generated by a simulator), or any combination of the two.

FIGS. 1A-1B are a pictorial flow diagram of an example process 100 for determining an occupancy using unobstructed sensor data. At operation 102, the process 100 may include determining potential characteristics for potential objects located within an environment. For instance, an example 104 illustrates that a vehicle 106 may determine (e.g., hypothesize) potential characteristics 108(1)-(6) (also referred to as "potential characteristics 108") for potential objects located within the environment. In the example of FIG. 1, the potential characteristics 108 include at least locations and orientation for the potential objects. For example, the potential characteristic 108(1) represents a first location and first orientation for a potential object, the potential characteristic 108(2) represents a second location and second orientation for a potential object, the potential characteristic 108(3) represents a third location and third orientation for a potential object, the potential characteristic 108(4) represents a fourth location and a fourth orientation for a potential object, the potential characteristic 108(5) represents a fifth location and fifth orientation for a potential object, the potential characteristic 108(6) represents a sixth location and a sixth orientation for a potential object. While the example of FIGS. 1A-1B illustrate only six potential characteristics 108, in other examples, the vehicle 106 may determine any number of potential characteristics 108 for any number of potential objects within the environment.

In some examples, the vehicle 106 may also hypothesize additional characteristic(s) associated with the potential objects. For example, the vehicle 106 may hypothesize at least object types associated with the objects. When determining the object types, the vehicle 106 may use the type of environment to determine the object types. For example, if the type of environment for which the vehicle 106 is determining the potential characteristics 108 includes a drivable surface, such as a highway, then the vehicle 106 may hypothesize the potential objects include other vehicles.

At operation 110, the process 100 may include receiving sensor data representing locations of points within the environment. For instance, an example 112 illustrates that the vehicle 106 is receiving the sensor data 114 representing the environment. In the example of FIGS. 1A-1B, the vehicle 106 may obtain the sensor data by using sensor(s) to emit sensor emissions (which are represented by the dashed lines), which may include light pulses, where a first portion of the sensor emissions are reflected off of an object 116 (which includes another vehicle in the example of FIGS. 1A-1B) and back towards the sensor(s) of the vehicle 106. Additionally, a second portion of the sensor emissions may reflect off other object(s) located within the environment and back towards the sensor(s) and/or may not be reflected back towards the sensor(s) (e.g., if the second portion of the sensor emissions do not contact an object for a threshold distance). As such, the sensor data may represent at least the locations of the points for which the sensor emissions reflected. For example, the sensor data representing the first portion of the sensor emissions may be associated with points on the object 116 while the sensor data representing the second portion of the sensor emissions may be associated with points on other object(s).

At operation 118, the process 100 may include determining, based at least in part on the points, verifications associated with the potential characteristics. For instance, an example 120 illustrates that the vehicle 106 using the sensor data in order to determine whether the potential characteristics 108 are verified, not verified, or cannot be determined. In the example of FIGS. 1A-1B, the vehicle 106 may determine that the potential characteristics 108(1), 108(2), and 108(4) are not verified. In some examples, the vehicle 106 makes the determinations based on the distances associated with the points represented by the sensor data. For example, the vehicle 106 may determine that areas of the environment that are between the vehicle 106 and the points represented by the sensor data include unobstructed areas, such that no object(s) are located within the areas.

As such, and as shown by the example of FIGS. 1A-1B, the vehicle 106 may determine that an object cannot be located at the first location associated with the potential characteristic 108(1) or the second location associated with the potential characteristic 108(2). This may be because the sensor emissions traveled through the first location associated with the potential characteristic 108(1) and through the second location associated with the potential characteristic 108(2) without contacting any object. Additionally, the vehicle 106 may determine that an object may be located at the fourth location associated with the potential characteristic 108(4), however, the object cannot include the fourth orientation. This may be because the first portion of the sensor emissions, which reflected off of the object 116, did not travel through the fourth location associated with the potential characteristic 108(4). As such, the vehicle 106 may determine that an object may be located at the fourth location. However, the second portion of the sensor emissions did travel through portions of the area of the fourth location and, as such, an object may not be located at those portions. As such, an object located at the fourth location cannot include the fourth orientation.

Furthermore, the vehicle 106 may determine that the potential characteristic 108(3) is verified. In some examples, the vehicle 106 makes this determination based on the first portion of the sensor emissions reflecting off of the object 116 and, as such, not traveling through the third location associated with the potential characteristic 108(3). Additionally, the vehicle 106 may determine that areas located to the sides of the third location (e.g., above and below the potential characteristic 108(3) in the example of FIGS. 1A-1B) are unobstructed based on the second portion of the sensor emissions. As such, the vehicle 106 may determine that the object 116 includes an orientation that is at least similar (e.g., within a threshold number of degrees) the third orientation. Because of these determinations, the vehicle 106 may verify that the object 116 includes the potential characteristic 108(3).

Moreover, the vehicle 106 may determine that the potential characteristics 108(5) and 108(6) cannot be verified or unverified. In some examples, the vehicle 106 makes these determinations based on the sensor emissions not reaching and/or passing through the areas of the environment that are associated with the potential characteristics 108(5) and 108(6). This is because, in the example of FIGS. 1A-1B, the object 116 is blocking the sensor emissions from traveling to the areas. In some examples, based on this determination, the vehicle 106 may hypothesize that object(s) are located at and/or include the orientations associated with the potential characteristics 108(5) and 108(6). For example, and since the potential characteristics 108(5) and 108(6) are associated with a roadway for which the vehicle 106 is navigating, the vehicle 106 may hypothesize that other vehicles are located at locations and include the orientations associated with the potential characteristics 108(5) and 108(6). The vehicle 106 may then perform one or more actions based on these hypotheses.

At operation 122, the process 100 may include updating a potential characteristic, which is verified, to represent an object. For instance, an example 124 illustrates the vehicle 106 may update the potential characteristic 108(3) in order to represent the object 116. In the example of FIGS. 1A-1B, updating the potential characteristic 108(3) may include rotating the potential characteristic 108(3) to match the actual orientation of the object 116, which is represented by a bounding box 126 that has been rotated 128. However, in other examples, updating the potential characteristic 108(3) may additionally, and/or alternatively, include changing one or more other characteristics associated with the potential characteristic 108(3), such as the location of the potential characteristic 108(3) and/or the type of object that was hypothesized as being at the third location associated with the potential characteristic 108(3). The vehicle 108 may then perform one or more actions based on the updated, verified potential characteristic 128 and the potential characteristics 108(5) and 108(6) that could not be verified or unverified.

For example, the vehicle 106 may navigate such that the vehicle 106 does not collide the object 126. For instance, the vehicle 106 may refrain from navigating through the third location associated with the potential characteristic 108(3) until the object 126 is no longer located at the third location. Additionally, the vehicle 106 may refrain from navigating through the fifth location associated with the potential characteristic 108(5) and/or the sixth location associated with the characteristic 108(6) until the vehicle 106 is able to verify that the fifth location and/or the sixth location are unobstructed.

Figure 2A:
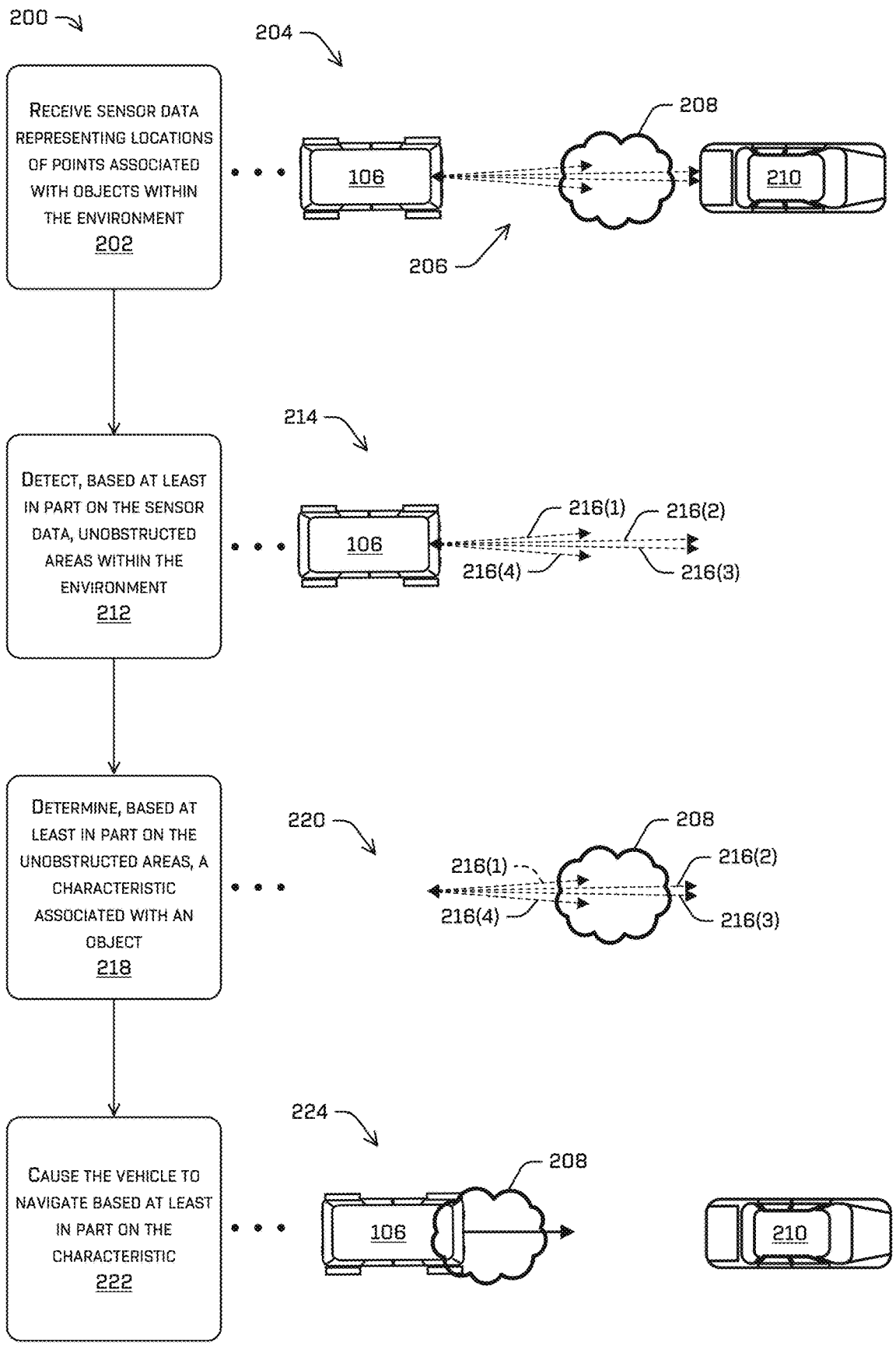
FIG. 2A is a pictorial flow diagram of a first example process for determining a characteristic of an object using unobstructed sensor data.

FIG. 2A is a pictorial flow diagram of a first example process 200 for determining a characteristic associated with an object using unobstructed sensor data. At operation 202, the process 200 may include receiving sensor data representing locations of points associated with objects within the environment. For instance, an example 204 illustrates that the vehicle 106 is receiving the sensor data 206 representing the environment. In the example of FIG. 2A, the vehicle 106 may obtain the sensor data by using sensor(s) to emit sensor emissions (which are represented by the dashed lines), which may include light pulses, where a first portion of the sensor emissions are reflected off of an object 208 (which includes exhaust in the example of FIG. 2A) and back towards the sensor(s) of the vehicle 106. Additionally, a second portion of the sensor emissions are reflected off of an object 210 (which includes another vehicle in the example of FIG. 2A) and back towards the sensor(s) of the vehicle 106. As such, the sensor data may represent at least the locations of the points for which the sensor emissions reflected. For example, the sensor data representing the first portion of the sensor emissions may be associated with points on the object 208 while the sensor data representing the second portion of the sensor emissions may be associated with points on the object 210.

At operation 212, the process 200 may include detecting, based at least in part on the sensor data, unobstructed areas within the environment. For instance, an example 214 illustrates the vehicle 106 determining the unobstructed areas within the environment using the sensor data. In some examples, the vehicle 106 determines the unobstructed areas using the sensor emissions 216(1)-(4) (also referred to as "sensor emissions 216") associated with the sensor data. For example, the vehicle 106 may determine that a first unobstructed area includes a first distance from the vehicle 106 that is along the first sensor emission 216(1). This is because the first sensor emission 216(1) reflected off of the object 208 and back to the sensor(s) of the vehicle 106. As such, the vehicle 106 may assume that no other objects are located between the vehicle 106 and the point associated with the first sensor emission 216(1). Additionally, the vehicle 106 may determine that a second unobstructed area includes a second distance from the vehicle 106 that is along the second sensor emission 216(2). This is because the second sensor emission 216(2) reflected off of the object 210 and back to the sensor(s) of the vehicle 106. As such, the vehicle 106 may assume that no other objects are located between the vehicle 106 and the point associated with the second sensor emission 216(2).

Furthermore, the vehicle 106 may determine that a third unobstructed area includes a third distance from the vehicle 106 that is along the third sensor emission 216(3). This is because the third sensor emission 216(3) reflected off of the object 210 and back to the sensor(s) of the vehicle 106. As such, the vehicle 106 may assume that no other objects are located between the vehicle 106 and the point associated with the third sensor emission 216(3). Finally, the vehicle 106 may determine that a fourth unobstructed area includes a fourth distance from the vehicle 106 that is along the fourth sensor emission 216(4). This is because the fourth sensor emission 216(4) reflected off of the object 208 and back to the sensor(s) of the vehicle 106. As such, the vehicle 106 may assume that no other objects are located between the vehicle 106 and the point associated with the fourth sensor emission 216(4). While the example of FIG. 2A illustrates the vehicle 106 as only using four sensor emissions 216 for identifying the unobstructed areas within the environment, in other examples, the vehicle 106 may use any number of sensor emissions.

At 218, the process 200 may include determining, based at least in part on the unobstructed areas, a characteristic associated with an object. For instance, an example 220 illustrates that the vehicle 106 may use the unobstructed areas to determine the characteristic associated with at least the object 208. As shown, based on a first portion of the sensor data, which is represented by the sensor emissions 216(2)-(3), the vehicle 106 may determine that the object 208 is located at an area within the environment since the sensor emissions 216(2)-(3) reflected off of the object 208 and back towards the vehicle 106. However, based on a second portion of the sensor data, which is represented by the sensor emissions 216(1) and 216(4), the vehicle 106 may initially determine that the area includes an unobstructed area since the sensor emissions 216(1) and 216(4) passed through the object 208 and reflected off of the object 210. As such, the vehicle 106 may determine a classification (e.g., an object type) associated with the object 208 using the sensor data.

In some examples, the vehicle 106 makes the determination based on the percentage of sensor emissions 216 that reflected off of the object 208 as compared to the percentage of sensor emissions 216 that passed through the object 208. For example, a first type of object, such as fog, may reflect a first percentage of the sensor emissions 216 that are output by the sensor(s) while a second type of object, such as exhaust, may reflect a second percentage of sensor emissions 216. Additionally, or alternatively, in some examples, the vehicle 106 makes the determination based on the locations of the sensor emissions 216 that reflected off of the object 208 and the locations of the sensor emissions 216 that passed through the object 208. In the example of FIG. 2A, the vehicle 106 may determine that the object 208 includes exhaust.

In some examples, the vehicle 106 may use one or more components (e.g., one or more models) to determine the characteristic associated with the object 208. For example, the vehicle 106 may input, into the component(s), data representing at least the distances to the points that are associated with the sensor emissions 216(2)-(3), the directions of the sensor emissions 216(2)-(3), the distances to the points that are associated with the sensor emission 216(1) and 216(4), the directions of the sensor emissions 216(1) and 216(4), the percentage of sensor emissions 216(1) and 216(4) that passed through the object 208, the percentage of sensor emissions 208(2)-(3) that reflected off of the object 208, and/or the like. The component(s) may then analyze the data in order to determine the characteristic, using one or more of the processes described herein. Additionally, the vehicle 106 may then receive, from the component(s), data representing the characteristic.

At operation 222, the process 200 may include causing the vehicle to navigate based at least in part on the characteristic. For instance, an example 224 illustrates that the vehicle 106 may determine a path for navigating based on the characteristic. For example, and as shown by the example of FIG. 2A, since the object 208 includes exhaust, the vehicle 106 may determine to continue along a path that is through the object 208.

Figure 2B:
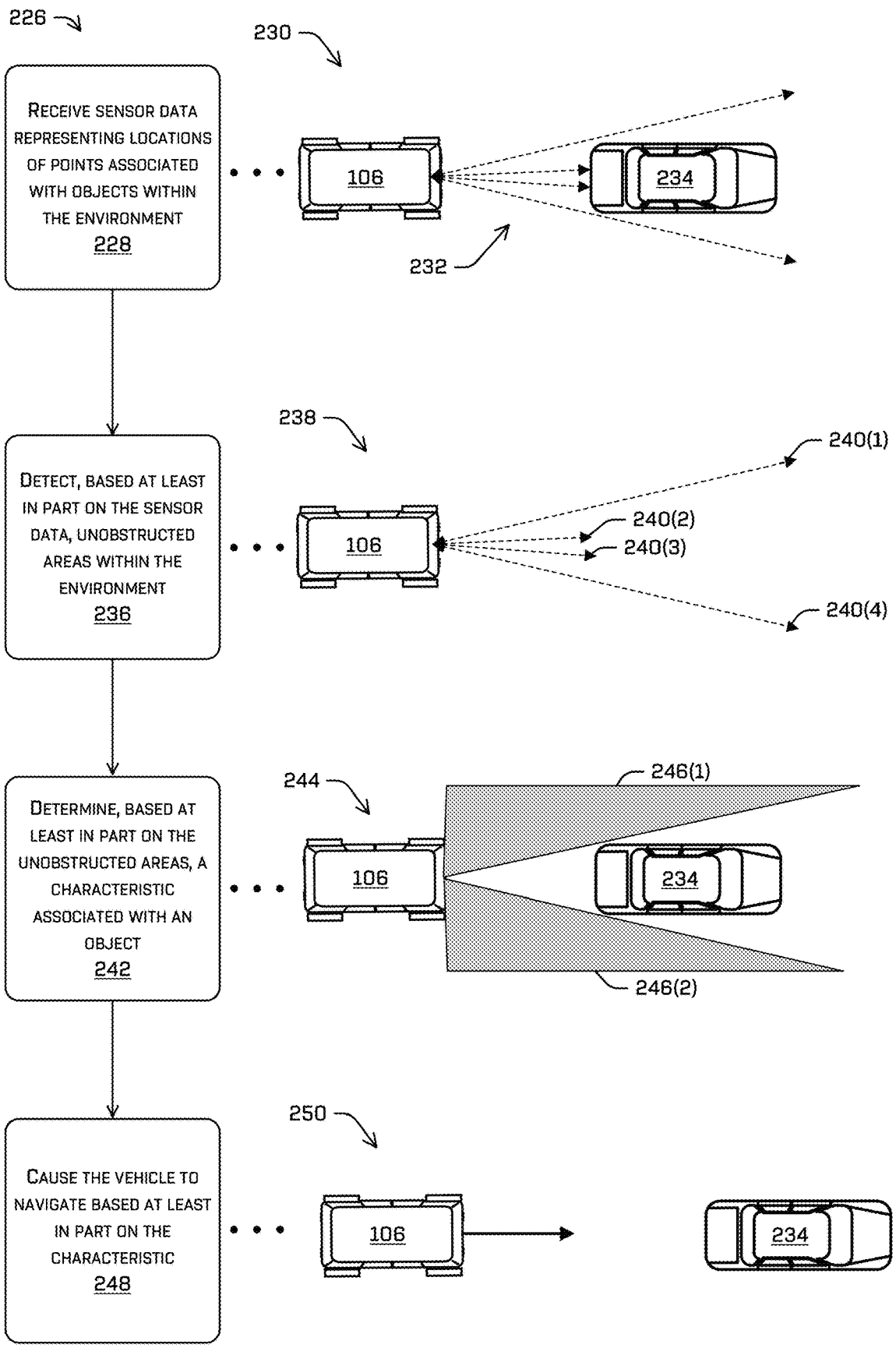
FIG. 2B is a pictorial flow diagram of a second example process for determining a characteristic of an object using unobstructed sensor data.

FIG. 2B is a pictorial flow diagram of a second example process 226 for determining a characteristic associated with an object using unobstructed sensor data. At operation 228, the process 226 may include receiving sensor data representing locations of points associated with objects within the environment. For instance, an example 230 illustrates that the vehicle 106 is receiving the sensor data 232 representing the environment. In the example of FIG. 2B, the vehicle 106 may obtain the sensor data by using sensor(s) to emit sensor emissions (which are represented by the dashed lines), which may include light pulses, where a first portion of the sensor emissions are reflected off of an object 234 (which includes another vehicle in the example of FIG. 2B) and back towards the sensor(s) of the vehicle 106. Additionally, a second portion of the sensor emissions may be reflected off additional object (which are not illustrated in the example of FIG. 2B for clarity reasons) and back towards the sensor(s) of the vehicle 106 and/or may not return to the vehicle 106. As such, the sensor data may represent at least the locations of the points for which the sensor emissions reflected. For example, the sensor data representing the first portion of the sensor emissions may be associated with points on the object 234.

At operation 236, the process 226 may include detecting, based at least in part on the sensor data, unobstructed areas within the environment. For instance, an example 238 illustrates the vehicle 106 determining the unobstructed areas within the environment using the sensor data. In some examples, the vehicle 106 determines the unobstructed areas using the sensor emissions 240(1)-(4) (also referred to as "sensor emissions 240") associated with the sensor data. For example, the vehicle 106 may determine that a first unobstructed area includes a first distance from the vehicle 106 that is along the first sensor emission 240(1). This is because the first sensor emission 240(1) reflected off of an additional object (not illustrated) and back to the sensor(s) of the vehicle 106. As such, the vehicle 106 may assume that no other objects are located between the vehicle 106 and the point associated with the first sensor emission 240(1). Additionally, the vehicle 106 may determine that a second unobstructed area includes a second distance from the vehicle 106 that is along the second sensor emission 240(2). This is because the second sensor emission 240(2) reflected off of the object 234 and back to the sensor(s) of the vehicle 106. As such, the vehicle 106 may assume that no other objects are located between the vehicle 106 and the point associated with the second sensor emission 240(2).

Furthermore, the vehicle 106 may determine that a third unobstructed area includes a third distance from the vehicle 106 that is along the third sensor emission 240(3). This is because the third sensor emission 240(3) reflected off of the object 234 and back to the sensor(s) of the vehicle 106. As such, the vehicle 106 may assume that no other objects are located between the vehicle 106 and the point associated with the third sensor emission 240(3). Finally, the vehicle 106 may determine that a fourth unobstructed area includes a fourth distance from the vehicle 106 that is along the fourth sensor emission 240(4). This is because the fourth sensor emission 240(4) reflected off of an additional object (not illustrated) and back to the sensor(s) of the vehicle 106. As such, the vehicle 106 may assume that no other objects are located between the vehicle 106 and the point associated with the fourth sensor emission 240(4). While the example of FIG. 2B illustrates the vehicle 106 as only using four sensor emissions 240 for identifying the unobstructed areas within the environment, in other examples, the vehicle 106 may use any number of sensor emissions.

At 242, the process 226 may include determining, based at least in part on the unobstructed areas, a characteristic associated with an object. For instance, an example 244 illustrates that the vehicle 106 may use the unobstructed areas to determine the characteristic associated with at least the object 234. As shown, based on a first portion of the sensor data, which is represented by the sensor emissions 240(2)-(3), the vehicle 106 may determine that the object 234 is located at an area within the environment (e.g., a first characteristic associated with the object 234) since the sensor emissions 240(2)-(3) reflected off of the object 234 and back towards the vehicle 106. Additionally, based on a second portion of the sensor data, which is represented by the sensor emissions 240(1) and 216(4), the vehicle 106 may determine that areas located proximate to the object 234 include unobstructed areas 246(1)-(2). The vehicle 106 may then determine an orientation associated with the object 234 (e.g., a second characteristic) using the unobstructed areas 246(1)-(2).

For example, the vehicle 106 may initially determine that the object 234 includes another vehicle. The vehicle 106 may then determine a width associated with the other vehicle 236 using the unobstructed areas 246(1)-(2). Using the width of the other vehicle, the vehicle 106 may determine the orientation. In some examples, the vehicle 106 may make this determination since the other vehicle will have a first width when the other vehicle includes a first orientation, a second width when the other vehicle includes a second orientation, a third width when the other vehicle includes a third orientation, and/or so forth. As such, the vehicle 106 may use the width to determine the orientation. While the example of FIG. 2B only illustrates determining two characteristics (e.g., the location and the orientation) associated with the object 234 using the unobstructed areas 246(1)-(2), in other examples, the vehicle 106 may determine additional and/or alternative characteristics.

In some examples, the vehicle 106 may use one or more components (e.g., one or more models) to determine the characteristic associated with the object 208. For example, the vehicle 106 may input, into the component(s), data representing at least the distances to the points associated with the sensor emissions 240(2)-(3), the directions of the sensor emissions 240(2)-(3), the distances to the points associated with the sensor emissions 240(1) and 240(4), the directions associated with the sensor emissions 240(1) and 240(4), differences between the distances associated with the sensor emissions 240(2)-(3) and the distances associated with the sensor emissions 240(1) and 240(4), the areas 246(1)-(2) of the environment that are unobstructed based on the sensor data (described herein), and/or the like. The component(s) may then analyze the data in order to determine the characteristic, using one or more of the processes described herein. Additionally, the vehicle 106 may then receive, from the component(s), data representing the characteristic.

At operation 248, the process 226 may include causing the vehicle to navigate based at least in part on the characteristic. For instance, an example 250 illustrates that the vehicle 106 may determine a path for navigating based on the characteristic. For example, and as shown by the example of FIG. 2, since the object 234 includes the orientation that is along the roadway, the vehicle 106 may determine to continue along a path that is through the object 234.

Figure 3:
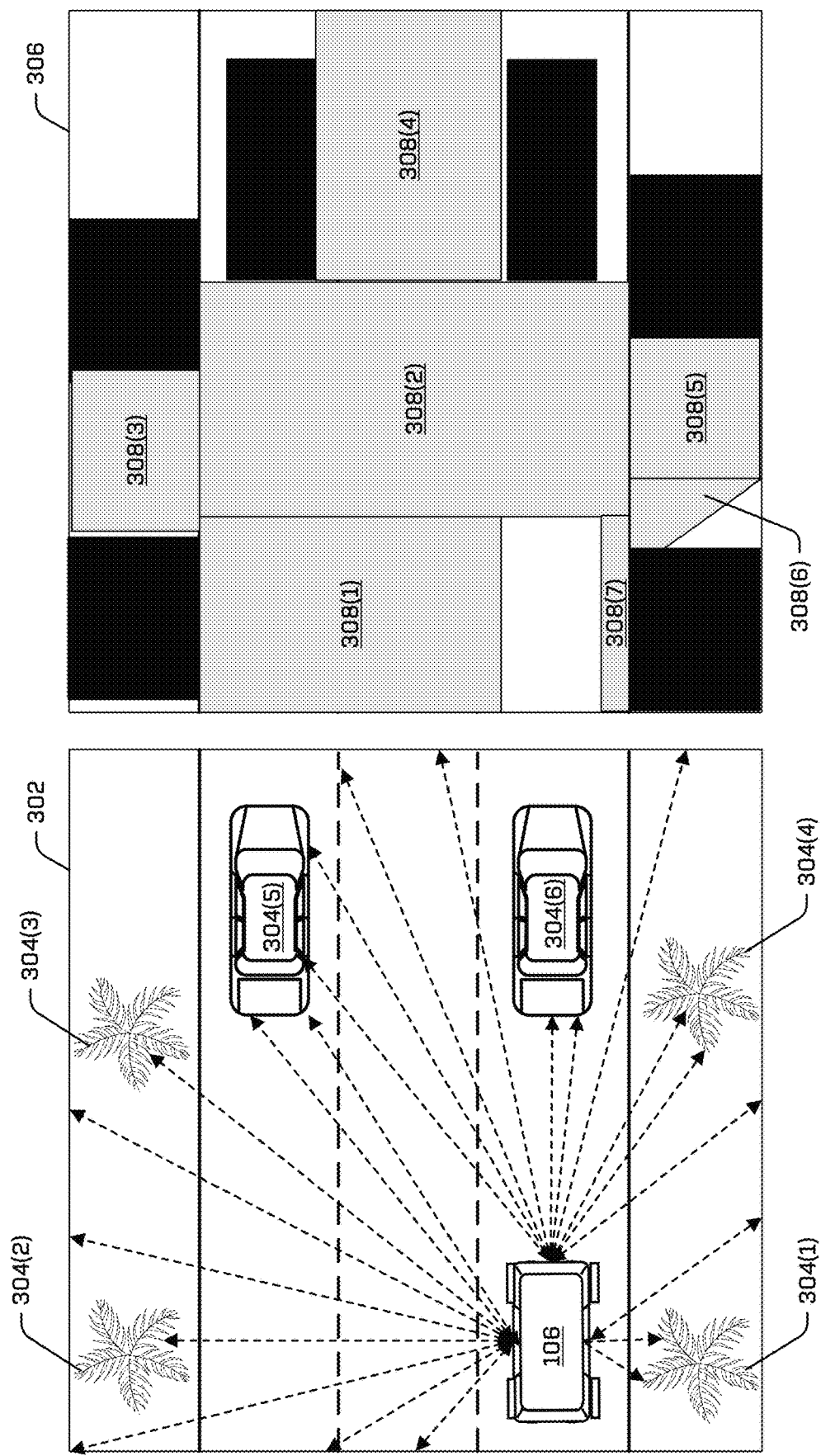
FIG. 3 illustrates an example of generating an occupancy heatmap using unobstructed sensor emissions.

FIG. 3 illustrates an example of generating an occupancy heatmap using unobstructed sensor emissions. As shown by the example of FIG. 3, the vehicle 106 may be navigating around an environment 302 that includes various objects 304(1)-(6) (also referred to as "objects 304"). While navigating, the vehicle 106 may be receiving sensor data representing objects in the environment 302. In some examples, and as illustrated by the example of FIG. 3, the vehicle 106 may obtain the sensor data by emitting sensor emissions (e.g., light pulses) that reflect off of the objects 304 and back to the sensor(s) of the vehicle 106, where the sensor emissions are represented by the dashed lines. As described herein, the sensor data may represent locations of points within the environment 302. For example, a portion of the sensor data may represent locations of points associated with the object 304(5). Additionally, another portion of the sensor data may represent locations of points associated with the object 304(6).

The vehicle 106 may then analyze the sensor data in order to determine an occupancy associated with the environment 302. For example, the vehicle 106 may analyze the sensor data to initially determine areas within the environment 302 that are obstructed by the objects 304. The vehicle 106 may further analyze the sensor data in order to determine areas within the environment 302 that are unobstructed by objects within the environment 302. As described herein, the vehicle 106 may determine the unobstructed areas using the distances associated with the points represented by the sensor data. For example, and using a sensor emission, the vehicle 106 may determine that an unobstructed area includes an area within the environment 302 that is between the vehicle 106 and the location associated with the reflection point of the sensor emission. For instance, and as shown in the example 3, the vehicle 106 may determine that an unobstructed area includes the area between the vehicle 106 and the object 304(6) based on the sensor emissions that reflected off of the object 304(6) and back to the vehicle 106. Additionally, the vehicle 106 may determine that an unobstructed area includes the area between the vehicle 106 and the object 304(5) based on the sensor emissions that reflected off of the object 304(5) and back to the vehicle 106.

The vehicle 106 may then generate a heatmap 306 representing the occupancy of the environment 302. In some examples, the heatmap 306 represents a likelihood that an area is obstructed or unobstructed. As described herein, the heatmap 306 may represent a discretized region of the environment 302 proximate to the vehicle 106. For example, the heatmap 306 may represent a 64×64 grid (or J×K sized grid) representing a 100 meter by 100 meter region around the vehicle 106. Of course, in other examples, the heatmap 306 can represent any size of region and may represent any number of discrete portions of the region. That is, the heatmap 306 may represent an environment at any level of resolution. In some cases, a portion of the heatmap 306 can be referred to as a cell of the heatmap 306. Each cell can comprise a prediction probability representing a probability that an object is at the area represented by the cell. For example, and as illustrated in the example of FIG. 3, the black cells may represent areas within the environment 302 that are obstructed by the objects 304. Additionally, the grey cells 308(1)-(7) may represent the areas within the environment 302 for which the vehicle 106 has verified unobstructed areas. Furthermore, the white cells may represent areas of the environment 302 that the vehicle 106 is unable to determine as being obstructed or unobstructed. This may be because these areas of the environment 302 are blocked by the objects 304 such that the sensor emissions do not travel to the areas.

Figure 4:
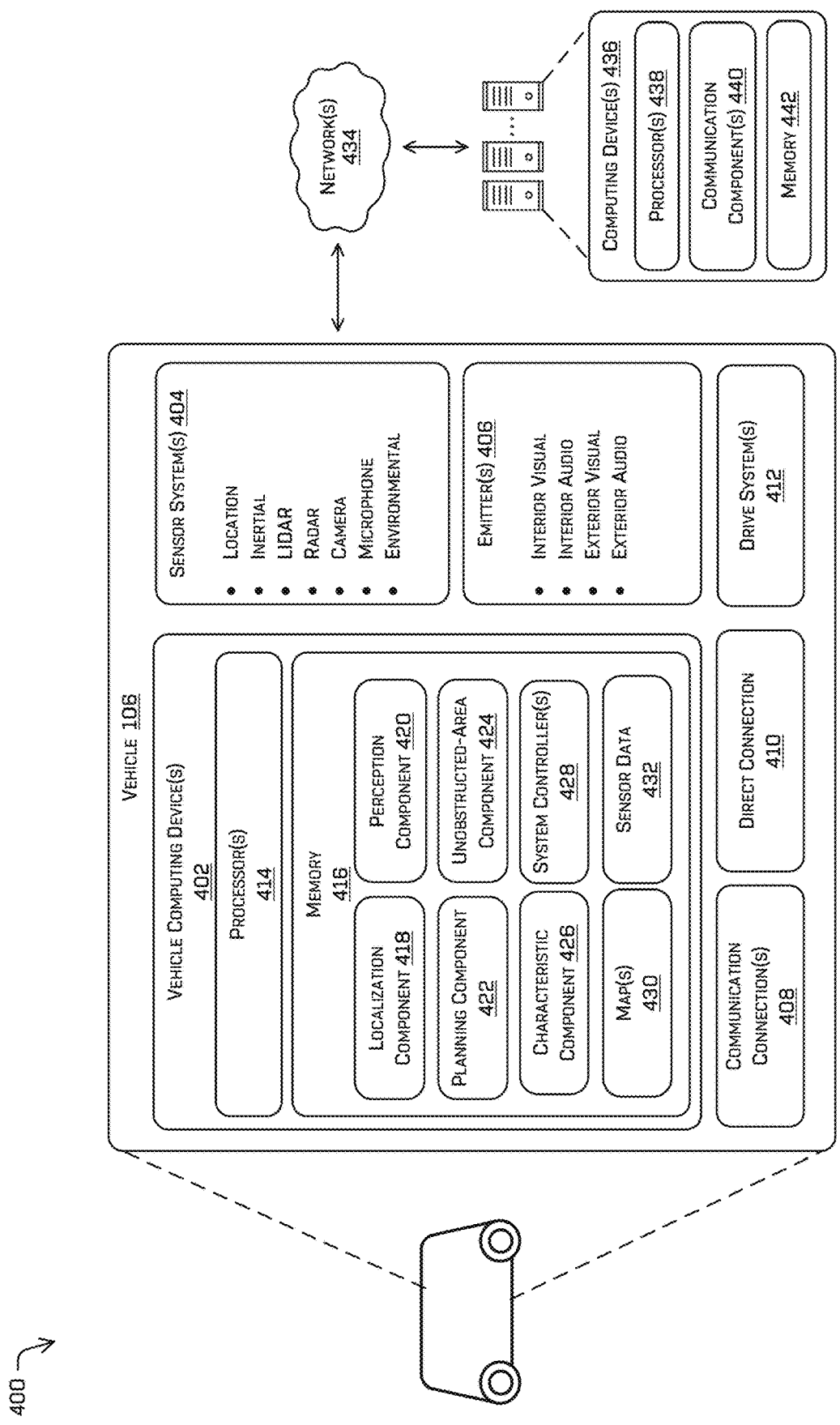
FIG. 4 depicts a block diagram of an example system for implementing the techniques described herein.

FIG. 4 depicts a block diagram of an example system 400 for implementing the techniques described herein, in accordance with embodiments of the disclosure. In at least one example, the system 400 can include the vehicle 106. The vehicle 106 can include a vehicle computing device 402, one or more sensor systems 404, one or more emitters 406, one or more communication connections 408, at least one direct connection 410, and one or more drive systems 412.

The vehicle computing device 402 can include one or more processors 414 and a memory 416 communicatively coupled with the processor(s) 414. In the illustrated example, the vehicle 106 is an autonomous vehicle. However, the vehicle 106 may be any other type of vehicle (e.g., a manually driven vehicle, a semi-autonomous vehicle, etc.), or any other system having at least an image capture device. In the illustrated example, the memory 416 of the vehicle computing device 402 stores a localization component 418, perception component 420, a planning component 422, an unobstructed-area component 424, a characteristic component(s) 426, one or more system controllers 428, and one or more maps 430. Though depicted in FIG. 4 as residing in the memory 416 for illustrative purposes, it is contemplated that the localization component 418, the perception component 420, the planning component 422, the unobstructed-area component 424, the characteristic component(s) 426, the system controller(s) 428, and/or the map(s) 430 can additionally, or alternatively, be accessible to the vehicle 106 (e.g., stored on, or otherwise accessible by, memory remote from the vehicle 106).

In at least one example, the localization component 418 can include functionality to receive sensor data 432 from the sensor system(s) 404 and to determine a position and/or orientation of the vehicle 106 (e.g., one or more of an x-, y-, z-position, roll, pitch, or yaw). For example, the localization component 418 can include and/or request/receive a map of an environment and can continuously determine a location and/or orientation of the vehicle 106 within the map. In some instances, the localization component 418 can utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the vehicle 106. In some instances, the localization component 418 can provide data to various components of the vehicle 106 to determine an initial position of the vehicle 106 for generating a candidate trajectory, as discussed herein.

In some instances, the perception component 420 can include functionality to perform object detection, segmentation, and/or classification. In some instances, the perception component 420 can provide processed sensor data 432 that indicates a presence of an object that is proximate to the vehicle 106 and/or a classification of the object as an object type (e.g., car, pedestrian, cyclist, animal, building, tree, road surface, curb, sidewalk, unknown, etc.). In additional and/or alternative examples, the perception component 420 can provide processed sensor data 432 that indicates one or more characteristics associated with a detected object and/or the environment in which the object is positioned. In some instances, characteristics associated with an object can include, but are not limited to, an x-position (global position), a y-position (global position), a z-position (global position), an orientation (e.g., a roll, pitch, yaw), an object type (e.g., a classification), a velocity of the object, an acceleration of the object, an extent of the object (size), etc. Characteristics associated with the environment can include, but are not limited to, a presence of another object in the environment, a state of another object in the environment, a time of day, a day of a week, a season, a weather condition, an indication of darkness/light, etc.

In general, the planning component 422 can determine a path for the vehicle 106 to follow to traverse through an environment. For example, the planning component 422 can determine various routes and trajectories and various levels of detail. For example, the planning component 422 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 422 can generate an instruction for guiding the vehicle 106 along at least a portion of the route from the first location to the second location. In at least one example, the planning component 422 can determine how to guide the vehicle 106 from a first waypoint in the sequence of waypoints to a second waypoint in the sequence of waypoints. In some instances, the instruction can be a trajectory, or a portion of a trajectory. In some instances, multiple trajectories can be substantially simultaneously generated (e.g., within technical tolerances) in accordance with a receding horizon technique, wherein one of the multiple trajectories is selected for the vehicle 106 to navigate.

In at least one example, the planning component 422 can determine a pickup location associated with a location. As used herein, a pickup location can be a specific location (e.g., a parking space, a loading zone, a portion of a ground surface, etc.) within a threshold distance of a location (e.g., an address or location associated with a dispatch request) where the vehicle 106 can stop to pick up a passenger. In at least one example, the planning component 422 can determine a pickup location based at least in part on determining a user identity (e.g., determined via image recognition or received as an indication from a user device, as discussed herein). Arrival at a pickup location, arrival at a destination location, entry of the vehicle by a passenger, and receipt of a "start ride" command are additional examples of events that may be used for event-based data logging.

In general, the unobstructed-area component 424 may be configured to perform one or more of the processes described herein in order to determine areas within an environment that are unobstructed by objects. For example, the unobstructed-area component 424 may be configured to analyze the sensor data 432 in order to determine locations to points represented by the sensor data 432. The unobstructed-area component 424 may then be configured to identify the unobstructed areas as included the areas that are between the vehicle 106 and the locations of the points within the environment.

In general, the characteristic component(s) 426 may be configured to analyze data in order to determine one or more characteristic associated with an object. For example, such as when a characteristic component 426 is configured to determine a type of object, the data may include, but is not limited to, first distances to first points within the environment that are associated with an object, first directions of first sensor emissions associated with the first points, second distances to second points within the environment that are associated with second sensor emissions that passed through the object, second directions of the second sensor emissions, the percentage of sensor emissions that passed through an object, the percentage of sensor emissions that reflected off of the object, and/or the like. The characteristic component 426 may thus analyze the data, using one or more of the processes described herein, in order to analyze the data in order to determine the type of object.

For another example, such as when a characteristic component 426 is configured to determine an orientation of an object, the data may include, but is not limited to, the distances to first points associated with the object, the directions of first sensor emissions associated with the first points, the distances to second points associated with second sensor emissions that passed proximate to the first points, the directions associated with the second sensor emissions, differences between the second distances and the first distances, areas of the environment that are unobstructed based on the sensor data (described herein), and/or the like. The characteristic component 426 may thus analyze the data, using one or more of the processes described herein, in order to analyze the data in order to determine the orientation of the object.

In some examples, computing devices may train these characteristic component(s) 426 using one or more techniques. For example, the computing devices may input the data into the characteristic(s) component(s) 426, along with known results associated with the data, in order to train the characteristic component(s) 426. In other words, the computing devices may train these classification component(s) 426 to use unobstructed sensor emissions in order to determine characteristics of objects.

In at least one example, the vehicle computing device 402 can include the system controller(s) 428, which can be configured to control steering, propulsion, braking, safety, emitters, communication, and other systems of the vehicle 106. These system controller(s) 428 can communicate with and/or control corresponding systems of the drive system(s) 412 and/or other components of the vehicle 106.

The memory 416 can further include the map(s) 430 that can be used by the vehicle 106 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment and can be loaded into working memory as needed. In at least one example, the map(s) 430 can include at least one map (e.g., images and/or a mesh). In some example, the vehicle 106 can be controlled based at least in part on the map(s) 430. That is, the map(s) 430 can be used in connection with the localization component 418, the perception component 420, and/or the planning component 422 to determine a location of the vehicle 106, identify entities in an environment, and/or generate routes and/or trajectories to navigate within an environment.

In some instances, aspects of some or all of the components discussed herein can include any models, algorithms, and/or machine learning algorithms. For example, in some instances, the components in the memory 416 can be implemented as a neural network. As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based at least in part on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet40, ResNet101, VGG, DenseNet, PointNet, and the like.

As discussed above, in at least one example, the sensor system(s) 404 can include lidar sensors, radar sensors, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 404 can include multiple instances of each of these or other types of sensors. For instance, the lidar sensors can include individual lidar sensors located at the corners, front, back, sides, and/or top of the vehicle 106. As another example, the camera sensors can include multiple cameras disposed at various locations about the exterior and/or interior of the vehicle 106. The sensor system(s) 404 can provide input to the vehicle computing device 402. Additionally or alternatively, the sensor system(s) 404 can send the sensor data 432, via the one or more network(s) 434, to computing device(s) 436 at a particular frequency, after a lapse of a predetermined period of time, upon occurrence of one or more conditions, in near real-time, etc.

The vehicle 106 can also include the emitter(s) 406 for emitting light and/or sound, as described above. The emitter(s) 406 in this example include interior audio and visual emitters to communicate with passengers of the vehicle 106. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 406 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 106 can also include the communication connections(s) 408 that enable communication between the vehicle 106 and one or more other local or remote computing device(s). For instance, the communication connection(s) 408 can facilitate communication with other local computing device(s) on the vehicle 106 and/or the drive system(s) 412. Also, the communication connection(s) 408 can allow the vehicle 106 to communicate with other nearby computing device(s) (e.g., other nearby vehicles, traffic signals, etc.). The communications connection(s) 408 also enable the vehicle 106 to communicate with the remote teleoperations computing devices or other remote services.

The communications connection(s) 408 can include physical and/or logical interfaces for connecting the vehicle computing device 402 to another computing device or a network, such as network(s) 434. For example, the communications connection(s) 408 can enable Wi-Fi-based communication such as via frequencies defined by the IEEE 802.11 standards, short range wireless frequencies such as Bluetooth®, cellular communication (e.g., 2G, 2G, 4G, 4G LTE, 4G, etc.) or any suitable wired or wireless communications protocol that enables the respective computing device to interface with the other computing device(s).

In at least one example, the vehicle 106 can include one or more drive systems 412. In some instances, the vehicle 106 can have a single drive system 412. In at least one example, if the vehicle 106 has multiple drive systems 412, individual drive systems 412 can be positioned on opposite ends of the vehicle 106 (e.g., the front and the rear, etc.). In at least one example, the drive system(s) 412 can include one or more sensor systems to detect conditions of the drive system(s) 412 and/or the surroundings of the vehicle 106. By way of example and not limitation, the sensor system(s) 404 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system(s), cameras or other image sensors, ultrasonic sensors to acoustically detect entities in the surroundings of the drive system(s), lidar sensors, radar sensors, etc. Some sensors, such as the wheel encoders can be unique to the drive system(s) 412. In some cases, the sensor system(s) 404 on the drive system(s) 412 can overlap or supplement corresponding systems of the vehicle 106 (e.g., sensor system(s) 404).

The drive system(s) 412 can include many of the vehicle systems, including a high voltage battery, a motor to propel the vehicle 106, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 412 can include a drive system controller which can receive and preprocess the sensor data 432 from the sensor system(s) 404 and to control operation of the various vehicle systems. In some instances, the drive system controller can include one or more processors and memory communicatively coupled with the one or more processors. The memory can store instructions to perform various functionalities of the drive system(s) 412. Furthermore, the drive system(s) 412 also include one or more communication connection(s) that enable communication by the respective drive system with one or more other local or remote computing device(s).

In at least one example, the direct connection 410 can provide a physical interface to couple the one or more drive system(s) 412 with the body of the vehicle 106. For example, the direct connection 410 can allow the transfer of energy, fluids, air, data, etc. between the drive system(s) 412 and the vehicle 106. In some instances, the direct connection 410 can further releasably secure the drive system(s) 412 to the body of the vehicle 106.

As further illustrated in FIG. 4, the computing device(s) 436 can include processor(s) 438, communication connection(s) 440, and memory 442. The processor(s) 414 of the vehicle 106 and/or the processor(s) 438 of the computing device(s) 436 (and/or other processor(s) described herein) can be any suitable processor capable of executing instructions to process data and perform operations as described herein. By way of example and not limitation, the processor(s) 414 and the processor(s) 438 can comprise one or more Central Processing Units (CPUs), Graphics Processing Units (GPUs), or any other device or portion of a device that processes electronic data to transform that electronic data into other electronic data that can be stored in registers and/or memory. In some instances, integrated circuits (e.g., ASICs, etc.), gate arrays (e.g., FPGAs, etc.), and other hardware devices can also be considered processors in so far as they are configured to implement encoded instructions.

The memory 416 and the memory 442 (and/or other memory described herein) are examples of non-transitory computer-readable media. The memory 416 and the memory 442 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 4 is illustrated as a distributed system, in alternative examples, components of the computing device(s) 436 can be associated with the vehicle 106. That is, the vehicle 106 can perform one or more of the functions associated with the computing device(s) 436 and/or the computing device(s) 436 can perform one or more of the functions associated with the vehicle 106. For example, the computing device(s) 436 may include the unobstructed-area component 424 and/or the characteristic component(s) 426. The computing device(s) 436 may then use the unobstructed-area component 424 and/or the characteristic component(s) 426 to perform one or more of the processes described herein.

Figure 5:
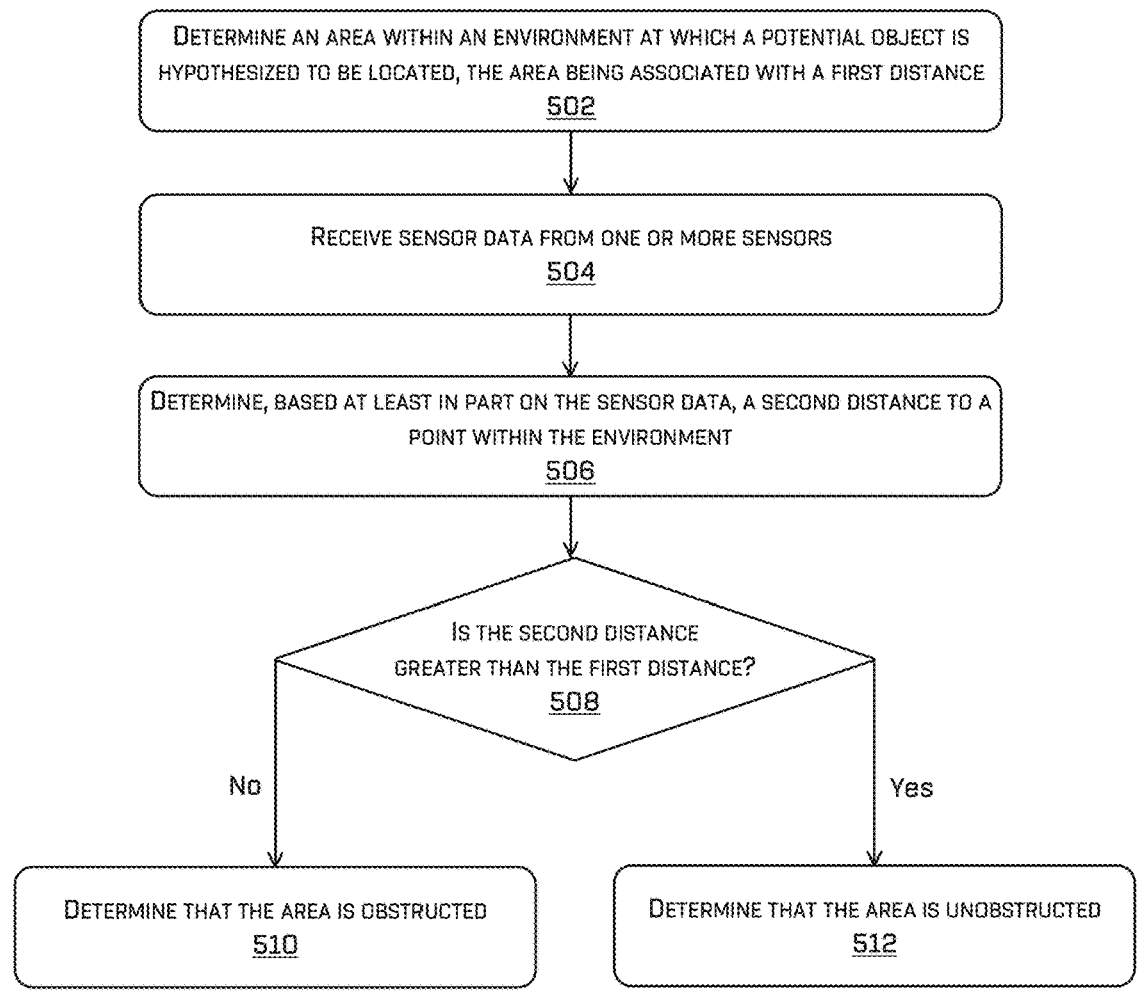
FIG. 5 illustrates a flow diagram of an example process for determining an occupancy using unobstructed sensor data.
Figure 6:
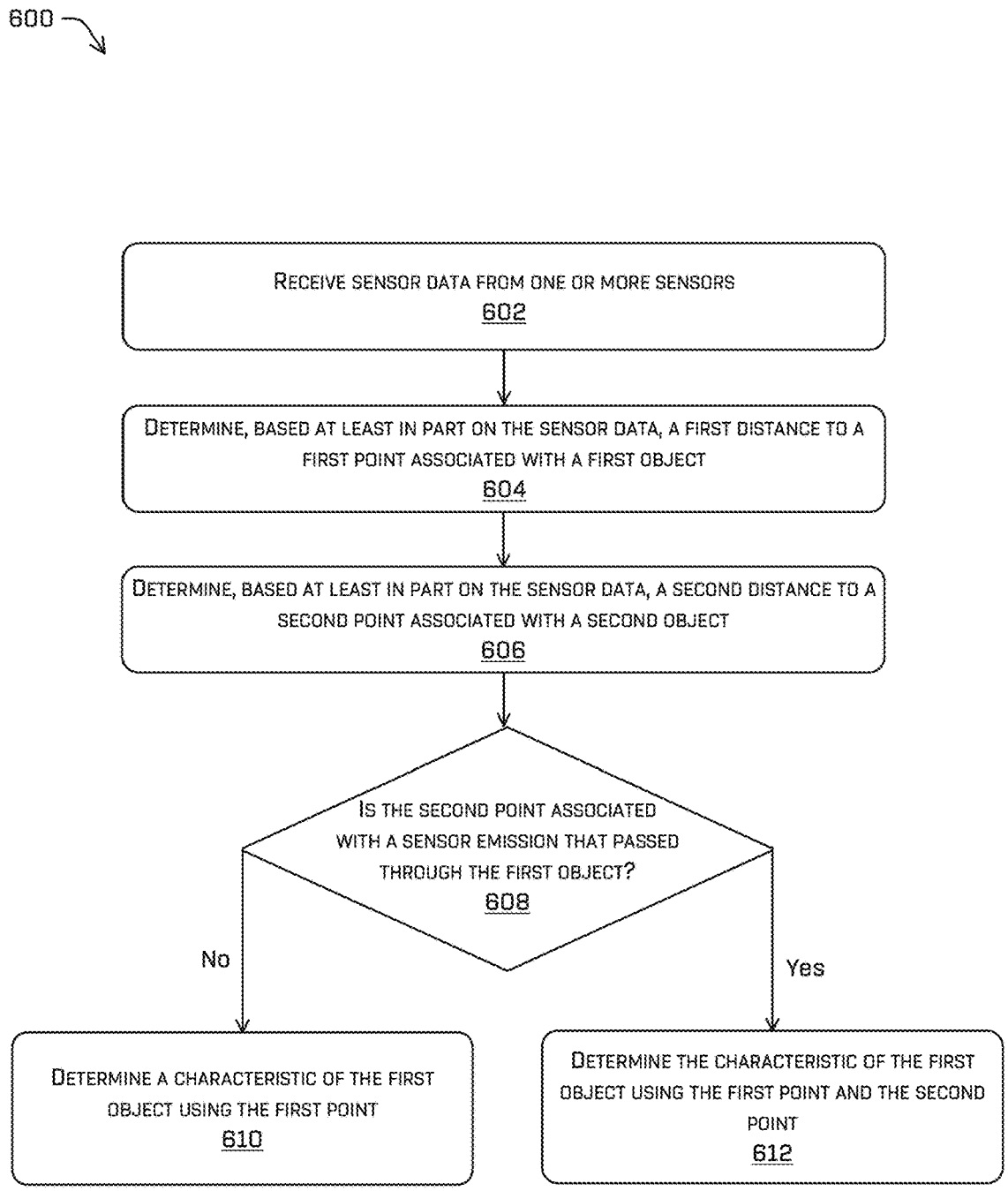
FIG. 6 illustrates a flow diagram of an example process for determining a characteristic of an object using unobstructed sensor data.

FIGS. 5 and 6 illustrate example processes in accordance with the disclosure. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be omitted or combined in any order and/or in parallel to implement the processes.

FIG. 5 illustrates a flow diagram of an example process 500 for determining an occupancy using unobstructed sensor data. At operation 502, the process 500 may include determining an area within an environment at which a potential object is hypothesized to be located, the area being associated with a first distance. For instance, the vehicle 106 may hypothesize that the potential object may be located at the area within the environment. In some examples, the vehicle 106 may also hypothesize one or more additional characteristics associated with the potential object, such as the orientation of the potential object. Additionally, in some examples, the vehicle 106 may hypothesize that additional potential object(s) may be located at additional area(s) within the environment and/or include additional positions (e.g., orientations) at the area.

At operation 504, the process 500 may include receiving sensor data from one or more sensors. For instance, the vehicle 106 may receive the sensor data from one or more sensor(s) of the vehicle 106. In some examples, the sensor data may include lidar data obtained from lidar sensor(s) of the vehicle 106. In such examples, the sensor data may represent at least locations of points within the environment, where the lidar sensor(s) determine the location(s) of points using sensor emissions (e.g., light pulses). Additionally, or alternatively, in some examples, the sensor data may include a different type of data, such as image data obtained camera(s) of the vehicle 106. Additionally or alternatively, the sensor data may be received from one or more other sensors of the vehicle 106 and/or from one or more sensors located remote from the vehicle.

At operation 506, the process 500 may include determining, based at least in part on the sensor data, a second distance to a point within the environment. For instance, the vehicle 106 may analyze the sensor data in order to determine the second distance to the point within the environment. In some examples, the vehicle 106 may further analyze the sensor data to determine a classification of an object associated with the point (e.g., the object that the sensor emission associated with the point reflected off). Additionally, in some examples, the vehicle 106 may analyze the sensor data to determine that a direction of the sensor emission associated with the point is substantially directed towards the area within the environment. In other words, the vehicle 106 may determine, based on the direction, whether the sensor emission would have contacted the potential object if the potential object were located within the area of the environment.

At operation 508, the process 500 may include determining if the second distance is greater than the first distance. For instance, the vehicle 106 may compare the second distance to the first distance to determine whether the second distance is greater than the first distance. If, at operation 508, it is determined that the second distance is not greater than the first distance, then at operation 510, the process 500 may include determining that the area is obstructed. For instance, if the vehicle 106 determines that the second distance is not greater than the first distance, then the vehicle 106 may determine that the area is obstructed by an object. This may be because the sensor emission associated with the point reflected off of an object located within the area and back towards the sensor(s).

However, if at operation 508, it is determined that the second distance is greater than the first distance, then at operation 512, the process 500 may include determining that the area is unobstructed. For instance, if the vehicle 106 determines that the second distance is greater than the first distance, then the vehicle 106 may determine that the area is unobstructed by an object. This may be because the sensor emission associated with the point passed through the area without reflecting off of an object. As such, the vehicle 106 may determine that an object is not located within the area.

FIG. 6 illustrates a flow diagram of a first example process 600 for determining a characteristic of an object using unobstructed sensor data. At operation 602, the process 600 may include receiving sensor data from one or more sensors. For instance, the vehicle 106 may receive the sensor data from the sensor(s) of the vehicle 106. In some examples, the sensor data may include lidar data from lidar sensor(s) of the vehicle 106. In such examples, the sensor(s) of the vehicle may obtain the sensor data by emitting sensor emissions (e.g., light pulses) that reflect off of objects within the environment and back to the sensor(s). Additionally, or alternatively, in some examples, the sensor data may include a different type of data, such as image data obtained by camera(s) of the vehicle 106. Additionally or alternatively, the sensor data may be received from one or more other sensors of the vehicle 106 and/or from one or more sensors located remote from the vehicle.

At operation 604, the process 600 may include determining, based at least in part on the sensor data, a first distance to a first point associated with a first object. For instance, the vehicle 106 may analyze the sensor data in order to determine the first distance to the first point. In some examples, such as when the sensor data includes lidar data, the sensor data may represent the first distance to the first point. Additionally, or alternatively, in some examples, such as when the sensor data includes image data, the vehicle 106 may analyze the sensor data in order to determine the first distance to the first point (e.g., determine the first distance to the first object).

At operation 606, the process 600 may include determining, based at least in part on the sensor data, a second distance to a second point associated with a second object. For instance, the vehicle 106 may analyze the sensor data in order to determine the second distance to the second point. In some examples, such as when the sensor data includes lidar data, the sensor data may represent the second distance to the second point. Additionally, or alternatively, in some examples, such as when the sensor data includes image data, the vehicle 106 may analyze the sensor data in order to determine the second distance to the second point (e.g., determine the second distance to the second object).

At operation 608, the process 600 may include determining whether the second point is associated with a sensor emission that passed thought the first object. For instance, the vehicle 106 may determine whether the sensor emission associated with the second point passed through the first object. In some examples, the vehicle 106 makes the determination based on a direction associated with the second point. For instance, and based on the location of the second point within the environment, the vehicle 106 may determine if the direction of the sensor emission was such that the sensor emission would have passed through the first object (e.g., the sensor emission was directed substantially towards the first object).

If, at operation 608, it is determined that the second point is associated with the sensor emission that did not pass through the first object, then at operation 610, the process 600 may include determining a characteristic of the first object using the first point. For instance, if the vehicle 106 determines that the sensor emission did not pass through the first object, then the vehicle 106 may determine the characteristic of the first object using the sensor data associated with the first point, but not the sensor data associated with the second point. The characteristic may include, but is not limited to, a classification of the object (e.g., a type of object), an orientation of the object, a location of the object, and/or the like.

However, if, at operation 608, it is determined that the second point is associated with the sensor emission that did pass through the first object, then at operation 612, the process 600 may include determining the characteristic of the first object using the first point and the second point. For instance, if the vehicle 106 determines that the sensor emission did pass through the first object, then the vehicle 106 may determine the characteristic of the first object using the sensor data associated with the first point and the sensor data associated with the second point. For example, the vehicle 106 may determine that the object includes a specific classification, such as fog, exhaust, and/or the like, which allows some sensor emissions to pass through while reflecting other sensor emissions.

Figure 7:
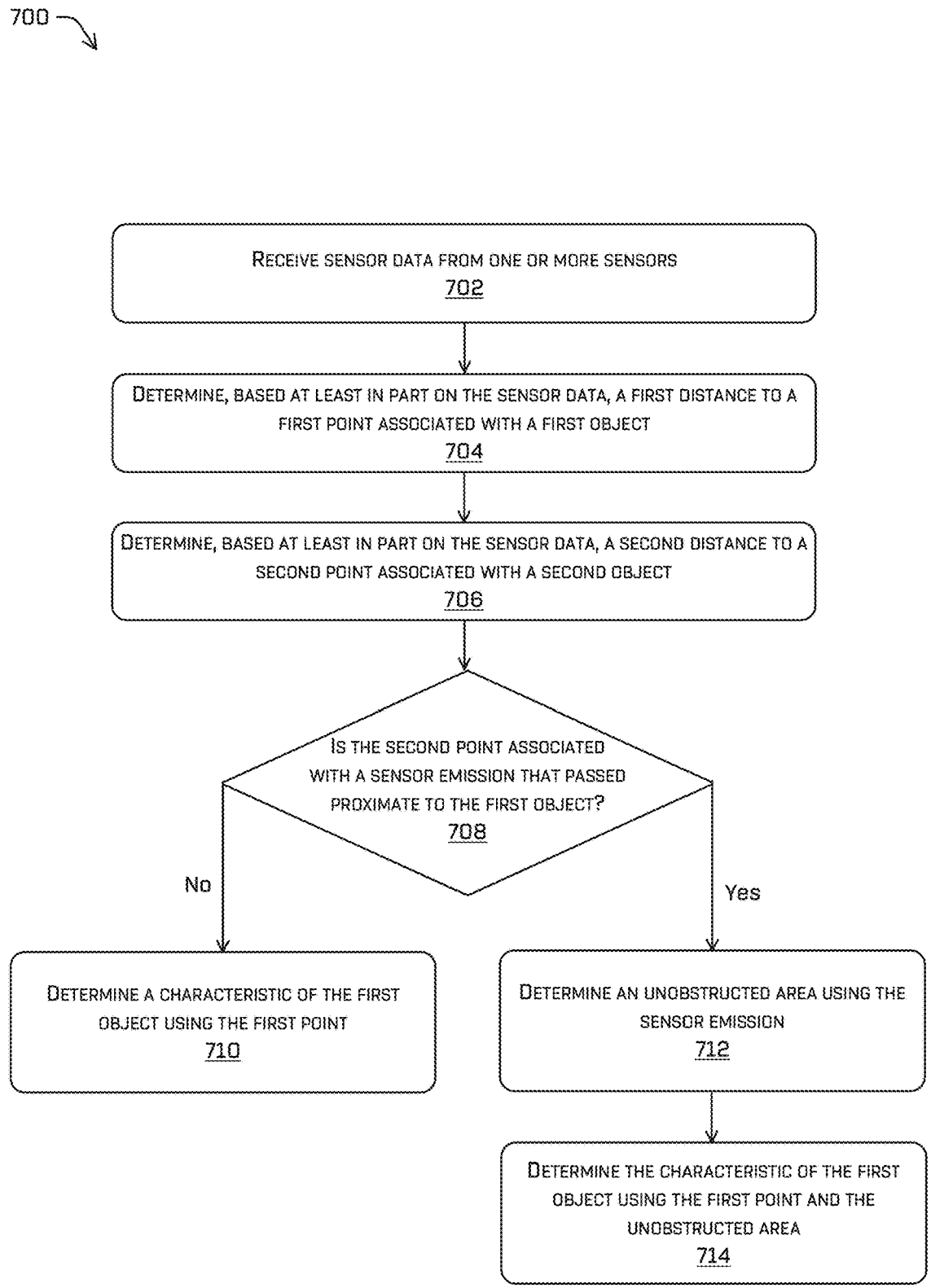
FIG. 7 illustrates a flow diagram of another example process for determining a characteristic of an object using unobstructed sensor data.

FIG. 7 illustrates a flow diagram of a second example process 700 for determining a characteristic of an object using unobstructed sensor data. At operation 702, the process 700 may include receiving sensor data from one or more sensors. For instance, the vehicle 106 may receive the sensor data from the sensor(s) of the vehicle 106. In some examples, the sensor data may include lidar data from lidar sensor(s) of the vehicle 106. In such examples, the sensor(s) of the vehicle may obtain the sensor data by emitting sensor emissions (e.g., light pulses) that reflect off of objects within the environment and back to the sensor(s). Additionally, or alternatively, in some examples, the sensor data may include a different type of data, such as image data obtained by camera(s) of the vehicle 106. Additionally or alternatively, the sensor data may be received from one or more other sensors of the vehicle 106 and/or from one or more sensors located remote from the vehicle.

At operation 704, the process 700 may include determining, based at least in part on the sensor data, a first distance to a first point associated with a first object. For instance, the vehicle 106 may analyze the sensor data in order to determine the first distance to the first point. In some examples, such as when the sensor data includes lidar data, the sensor data may represent the first distance to the first point. Additionally, or alternatively, in some examples, such as when the sensor data includes image data, the vehicle 106 may analyze the sensor data in order to determine the first distance to the first point (e.g., determine the first distance to the first object).

At operation 706, the process 700 may include determining, based at least in part on the sensor data, a second distance to a second point associated with a second object. For instance, the vehicle 106 may analyze the sensor data in order to determine the second distance to the second point. In some examples, such as when the sensor data includes lidar data, the sensor data may represent the second distance to the second point. Additionally, or alternatively, in some examples, such as when the sensor data includes image data, the vehicle 106 may analyze the sensor data in order to determine the second distance to the second point (e.g., determine the second distance to the second object).

At operation 708, the process 600 may include determining whether the second point is associated with a sensor emission that passed proximate to the first object. For instance, the vehicle 106 may determine whether the sensor emission associated with the second point passed proximate to the first object. In some examples, the vehicle 106 makes the determination based on a direction associated with the second point. For instance, in some examples, the vehicle 106 may determine that the sensor emission passed proximate to the first object when a direction associated with the sensor emission is within a threshold angle to a direction associated with the first object (and/or a direction associated with an additional sensor emission for the first point).

If, at operation 708, it is determined that the second point is associated with the sensor emission that did not pass proximate to the first object, then at operation 710, the process 700 may include determining a characteristic of the first object using the first point. For instance, if the vehicle 106 determines that the sensor emission did not proximate to the first object, then the vehicle 106 may determine the characteristic of the first object using the sensor data associated with the first point, but not the sensor data associated with the second point. The characteristic may include, but is not limited to, a classification of the object (e.g., a type of object), an orientation of the object, a location of the object, and/or the like.

However, if, at operation 708, it is determined that the second point is associated with the sensor emission that did pass proximate to the first object, then at operation 712, the process 700 may include determining an unobstructed area using the sensor emission. For instance, the vehicle 106 may use one or more of the processes described herein in order to determine the unobstructed area. Since the sensor emission passed proximate to the first object, the unobstructed area may also be located proximate to the first object.

At operation 714, the process 700 may include determining the characteristic of the first object using the first point and the unobstructed area. For instance, the vehicle 106 may determine the characteristic of the first object using the sensor data associated with the first point and the unobstructed area. For example, the vehicle 106 may determine that the object includes a specific orientation based on the area proximate to the first object including the unobstructed area.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

Conditional language such as, among others, "may," "could," or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

EXAMPLE CLAUSES

A: A system comprising: one or more processors; and one or more computer-readable media storing instructions that, when executed by the one or more processors, cause the system to perform operations comprising: determining a first area within an environment at which a first plurality hypothetical objects may be located; determining a second area within the environment at which a second plurality of hypothetical objects may be located; receiving sensor data from one or more sensors of a vehicle, where the sensor data is determined based on at least one sensor emission passing through the first area and reflecting from a real object at the second area; determining, based at least in part on the sensor data, that the first area is an unobstructed area not containing at least one of the first plurality of hypothetical objects; determining, based at least in part on the sensor data, an orientation and location for the real object located at the second area; and controlling the vehicle based at least in part on the second area including the real object.

B: The system as recited in paragraph A, wherein determining the orientation associated with the real object comprises at least: determining, based at least in part on the sensor data, that an emission path associated with a point passes in proximity to the real object without reflecting off the real object; and determining the orientation associated with the real object based at least in part on the emission path passing in proximity to the real object without reflecting off the real object.

C: The system as recited in either paragraph A or paragraph B, the operations further comprising: determining a third area within the environment at which a third plurality of hypothetical objects may be located, the third area being located farther from the vehicle than the second area; determining, based at least in part on the sensor data, that at least one sensor emission does not pass through the third area; and determining, based at least in part on the at least one sensor emission not passing through the area, that one or more of the third plurality of hypothetical objects may still be located at the third area, and wherein controlling the vehicle is further based at least in part on determining that the one or more of the third plurality of hypothetical objects may still be located at the third area.

D: The system as recited in any one of paragraphs A-C, the operations further comprising: determining a type of the environment associated with the first area; determining, based at least in part on the type of the environment, a type of hypothetical object that may be located at the first area; and determining the first plurality of hypothetical objects based at least in part on the type of hypothetical object that may be located at the first area.

E: A method comprising: determining a plurality of hypothetical objects that may be at a location within an environment; receiving sensor data from one or more sensors of a vehicle; determining, based at least in part on the sensor data, that at least some of the plurality of hypothetical objects are not located at the location; and controlling the vehicle based at least in part on determining that the at least some of the plurality of hypothetical objects are not located at the location.

F: The method as recited in paragraph E, further comprising: determining a hypothetical orientation for a hypothetical object from the plurality of hypothetical objects; determining, based at least in part on the sensor data, a real orientation of a real object; and updating, based at least in part on the real orientation, the location to include an additional location with the environment, and wherein controlling the vehicle is based at least in part on the additional location.

G: The method as recited in either paragraph E or paragraph F, wherein: determining that at least some of the plurality of hypothetical objects are not located at the location comprises at least determining, based at least in part on the sensor data, that a real object is located at the location; and the method further comprises: determining, based at least in part on the sensor data, that an emission path associated with a point passes in proximity to the real object without reflecting off the real object and determining an orientation of the real object based at least in part on the emission path passing in proximity to the real object without reflecting off the real object.

H: The method as recited in any one of paragraphs E-G, further comprising: determining a type of the environment associated with the location; and determining a type of hypothetical object that may be located at the location based at least in part on the type of the environment, and wherein determining the plurality of hypothetical objects that may be at the location within the environment is based at least in part on the type of hypothetical object.

I: The method as recited in any one of paragraphs E-H, further comprising: determining a type of the environment associated with the location; determining a type of hypothetical object that may be located at the location based at least in part on the type of the environment; determining a first position associated with a first hypothetical object from the plurality of hypothetical objects based at least in part on the type of hypothetical object; and determining a second position associated with a second hypothetical object from the plurality of hypothetical objects based at least in part on the type of hypothetical object.

J: The method as recited in any one of paragraphs E-I, wherein determining that at least some of the plurality of hypothetical objects are not located at the location comprises at least: determining, based at least in part on the sensor data, that at least one sensor emission passes through the location without reflecting off a real object; and determining that at least some of the plurality of hypothetical objects are not located at the location based at least in part on the sensor emission passing through the location without reflecting off the real object.

K: The method as recited in any one of paragraphs E-J, further comprising: determining, based at least in part on the sensor data, an additional location of a real object within the environment; determining that the additional location is along a path of the vehicle; and determining that the location is also along the path of the vehicle and obstructed by the real object, and wherein determining the plurality of hypothetical objects that may be at the location within the environment is based at least in part on the location also being along the path of the vehicle and obstructed by the real object.

L: The method as recited in any one of paragraphs E-L, further comprising: determining an additional plurality of hypothetical objects that may be at an additional location within the environment; determining, based at least in part on the sensor data, that at least one sensor emission passes through the additional location and reflects from a real object at the location; and determining that the additional location is unobstructed by the additional plurality of hypothetical objects.

M: The method as recited in paragraph L, further comprising generating a map indicating at least: the location within the environment is obstructed by the real object; and the additional location within the environment is unobstructed.

N: The method as recited in any one of paragraphs E-M, further comprising: determining an additional plurality of hypothetical objects that may be at an additional location within the environment, the additional location being farther from the vehicle than the location; and determining, based at least in part on the sensor data, that at least one sensor emission does not pass through the location and to the additional location; and determining, based at least in part on the at least one sensor emission not passing through the location and to the additional location, that one or more of the additional plurality of hypothetical objects may still be located at the additional location, and wherein controlling the vehicle is further based at least in part on determining that the one or more of the additional plurality of hypothetical objects may still be located at the additional location.

O: The method as recited in any one of paragraphs E-N, wherein receiving the sensor data from the one or more sensors of the vehicle comprises receiving lidar data from one or more lidar sensors of the vehicle.

P: One or more non-transitory computer-readable media storing instructions that, when executed by one or more processors, cause the one or more processors to perform operations comprising: determining a plurality of hypothetical objects that may be at a location within an environment; receiving sensor data from one or more sensors of a vehicle; determining, based at least in part on the sensor data, that at least some of the plurality of hypothetical objects are not located at the location; and controlling the vehicle based at least in part on determining that the at least some of the plurality of hypothetical objects are not located at the location.

Q: The one or more non-transitory computer-readable media as recited in paragraph P, the operations further comprising: determining a hypothetical orientation for a hypothetical object from the plurality of hypothetical objects; determining, based at least in part on the sensor data, a real orientation of a real object; and updating, based at least in part on the real orientation, the location to include an additional location with the environment, and wherein controlling the vehicle is based at least in part on the additional location.

R: The one or more non-transitory computer-readable media as recited in either paragraph P or paragraph Q, the operations further comprising: determining a type of the environment associated with the location; and determining a type of hypothetical object that may be located at the location based at least in part on the type of the environment, and wherein determining the plurality of hypothetical objects that may be at the location within the environment is based at least in part on the type of hypothetical object.

S: The one or more non-transitory computer-readable media as recited in any one of paragraphs P-R, the operations further comprising: determining a type of the environment associated with the location; determining a type of hypothetical object that may be located at the location based at least in part on the type of the environment; determining a first position associated with a first hypothetical object from the plurality of hypothetical objects based at least in part on the type of hypothetical object; and determining a second position associated with a second hypothetical object from the plurality of hypothetical objects based at least in part on the type of hypothetical object.

T: The one or more non-transitory computer-readable media as recited in any one of paragraphs P-S, wherein determining that at least some of the plurality of hypothetical objects are not located at the location comprises at least: determining, based at least in part on the sensor data, that at least one sensor emission passes through the location without reflecting off a real object; and determining that at least some of the plurality of hypothetical objects are not located at the location based at least in part on the sensor emission passing through the location without reflecting off the real object.

U: A system comprising: one or more processors; and one or more computer-readable media storing instructions that, when executed by the one or more processors, cause the system to perform operations comprising: receiving sensor data of an environment wherein the sensor data is associated with receiving, at a sensor, a reflection of an emission in the environment and a distance is determined based on the reflection of the emission; determining, based at least in part on the sensor data, that: a first point corresponds to an object in the environment; and a second point has a corresponding emission path that passes in proximity to the first point, wherein the second point is a greater distance away from the sensor than the first point; determining a characteristic associated with the object based on the first point and the corresponding emission path of the second point passing in proximity to the first point; and controlling a vehicle based at least in part on the characteristic associated with the object.

V: The system as recited in paragraph U, wherein determining the characteristic associated with the object comprises at least: inputting first data into a model, the first data representing at least: that the first point corresponds to the object; and that the second point has a corresponding emission path that passes in proximity to the first point without reflecting off the object; and receiving, from the model, second data representing the characterization.

W: The system as recited in either paragraph U or paragraph V, the operations further comprising: determining, based at least in part on the second point having the corresponding emission path that passes in proximity to the first point, that an area located proximate to the object is unobstructed, and wherein determining the characteristic associated with the object comprises determining an orientation associated with the object based at least in part on the first point and the area being unobstructed.

X: The system as recited in any one of paragraphs U-W, the operations further comprising: determining, based at least in part on the first point, an area within the environment at which the object is located; determining, based at least in part on the second point having the corresponding emission path that passes in proximity to the first point, that the corresponding emission path passes through the area without reflecting off the object; and determining an object type or orientation associated with the object based at least in part on the corresponding emission path passing through the area without reflecting off the object.

Y: A method comprising: receiving sensor data from one or more sensors of a vehicle; determining, based at least in part on the sensor data, that a first point is associated with an object; determining, based at least in part on the sensor data, that a second point has an emission path that passes in proximity to the object without reflecting off the object; determining a characteristic associated with the object based at least in part on the emission path of the second point passing in proximity to the object without reflecting off the object; and causing the vehicle to navigate based at least in part on the characteristic.

Z: The method as recited in paragraph Y, further comprising: determining that the second point is associated an additional object; and determining that the emission path did not reflect off the object based at least in part on the second point being associated with the additional object.

AA: The method as recited in either paragraph Y or paragraph Z, further comprising: determining a first distance associated with the first point; and determining a second distance associated with the second point, and wherein determining the characteristic associated with the object is further based at least in part on the first distance and the second distance.

AB: The method as recited in any one of paragraphs Y-AA, further comprising: determining, based at least in part on the first point, an area within the environment at which the object is located; determining that the emission path of the second point passes through the area without reflecting off the object; and determining that a first distance associated with the second point is greater than a second distance associated with the first point, and wherein determining the characteristic associated with the object comprises determining a type associated with the object based at least in part on the emission path passing through the area and the first distance being greater than the second distance.

AC: The method as recited in any one of paragraphs Y-AB, further comprising: determining, based at least in part on the sensor data, a percentage of sensor emissions that pass through the object unobstructed, the emission path of the second point being associated with the percentage of sensor emissions, and wherein determining the characteristic associated with the object comprises determining a type associated with the object based at least in part on the percentage of sensor emissions.

AD: The method as recited in any one of paragraphs Y-AC, wherein determining the characteristic associated with the object comprises determining an orientation associated with the object based at least in part on the first point and the emission path of the second point passing in proximity to the object without reflecting off the object.

AE: The method as recited in any one of paragraphs Y-AD, wherein determining the characteristic associated with the object comprises at least: inputting first data into a model, the first data representing at least: the first point associated with the object; and that the emission path of the second point passes in proximity to the object without reflecting off the object; and receiving, from the model, second data representing the characteristic associated with the object.

AF: The method as recited in any one of paragraphs Y-AE, further comprising: determining, based at least in part on the sensor data, a percentage of sensor emissions that pass through the object unobstructed, the emission path of the second point being associated with the percentage of sensor emissions, and wherein determining the characteristic associated with the object comprises at least: inputting first data into a model, the first data representing the percentage of sensor emissions that passed through the object unobstructed; and receiving, from the model, second data representing the characteristic associated with the object.

AG: The method as recited in any one of paragraphs Y-AF, wherein determining that the second point has the emission path that passes in proximity to the object comprises at least: inputting first data into a model, the first data representing at least: a location associated with a sensor that generated the sensor data representing the second point; and a location of the object within the environment; and receiving, from the model, second data indicating that the emission path of the second point passed in proximity to the object without reflecting off the object.

AH: The method as recited in any one of paragraphs Y-AG, wherein determining that the second point has the emission path that passes in proximity to the object without reflecting off the object comprises at least: determining, based at least in part on the sensor data, a first angle associated with an additional sensor emission of the first point; determining, based at least in part on the sensor data, a second angle associated with the sensor emission of the second point; determining that the first angle is within a threshold to the second angle; and determining that the second point reflected off an additional object.

AI: One or more non-transitory computer-readable media storing instructions that, when executed by one or more processors, cause the one or more processors to perform operations comprising: receiving sensor data from one or more sensors of a vehicle; determining, based at least in part on the sensor data, that a first point is associated with an object; determining, based at least in part on the sensor data, that a second point has an emission path that passes in proximity to the object without reflecting off the object; determining a characteristic associated with the object based at least in part on the emission path of the second point passing in proximity to the object without reflecting off the object; and causing the vehicle to navigate based at least in part on the characteristic.

AJ: The one or more non-transitory computer-readable media as recited in paragraph AI, the operations further comprising: determining that the second point is associated an additional object; and determining that the emission path did not reflect off the object based on the second point being associated with the additional object.'

AK: The one or more non-transitory computer-readable media as recited in either paragraph AI or paragraph AJ, the operations further comprising: determining, based at least in part on the first point, an area within the environment at which the object is located; and determining that the emission path of the second point passes through the area without reflecting off the object, and wherein determining the characteristic associated with the object comprises determining a type associated with the object based at least in part on the emission path passing through the area without reflecting off the object.

AL: The one or more non-transitory computer-readable media as recited in any one of paragraphs AI-AK, the operations further comprising: determining, based at least in part on the sensor data, a percentage of sensor emissions that pass through the object unobstructed, the emission path of the second point being associated with the percentage of sensor emissions, and wherein determining the characteristic associated with the object comprises determining a type associated with the object based at least in part on the percentage of sensor emissions.

AM: The one or more non-transitory computer-readable media as recited in any one of paragraphs AI-AL, wherein determining the characteristic associated with the object comprises determining an orientation associated with the object based at least in part on the first point and the emission path of the second point passing in proximity to the object without reflecting off the object.

AN: The one or more non-transitory computer-readable media as recited in any one of paragraphs AI-AM, wherein determining the characteristic associated with the object comprises at least: inputting first data into a model, the first data representing at least: the first point associated with the object; and that the emission path of the second point passes in proximity to the object without reflecting off the object; and receiving, from the model, second data representing the characteristic associated with the object.

What is claimed is:
1. A method comprising:
receiving sensor data of an environment from one or more sensors of a vehicle;
determining, based at least in part on the sensor data:

a first point along a first emission path reflected off a solid object, the first emission path being associated with a first angle, a second point, associated with an additional object, along a second emission path that passes in proximity to the solid object without reflecting off the solid object, the second emission path being associated with a second angle within a threshold of the first angle, and a percentage of sensor emissions that pass through the additional object unobstructed, the second emission path being associated with the percentage of sensor emissions;

determining a first characteristic associated with the solid object based at least in part on the first emission path and the second emission path;

determining, based at least in part on the percentage of sensor emissions, a second characteristic associated with the additional object, the second characteristic comprising a type of object; and controlling a trajectory of the vehicle based at least in part on the first characteristic or the second characteristic.

2. The method as recited in claim 1, further comprising:
determining that the second emission path did not reflect off the solid object based at least in part on the second point being associated with the additional object.

3. The method as recited in claim 1, further comprising:
determining a first distance associated with the first point; and
determining a second distance associated with the second point,
wherein determining the first characteristic associated with the solid object is further based at least in part on the first distance and the second distance.

4. The method as recited in claim 1, further comprising:
determining, based at least in part on the first point, an area within the environment at which the solid object is located;
determining that the second emission path of the second point passes through the area without reflecting off the solid object; and
determining that a first distance associated with the second point is greater than a second distance associated with the first point,
and wherein determining the first characteristic associated with the solid object comprises determining a type associated with the solid object based at least in part on the second emission path passing through the area and the first distance being greater than the second distance.

5. The method as recited in claim 1, wherein the sensor data is captured at a first time and the type of object associated with the additional object is one of: solid, fog, or vehicle exhaust.

6. The method as recited in claim 1, wherein determining the first characteristic associated with the solid object comprises determining an orientation associated with the solid object based at least in part on the first point and the second emission path.

7. The method as recited in claim 1, wherein determining the first characteristic associated with the solid object comprises at least:
inputting first data into a model, the first data representing at least:
the first point is reflected off the solid object; and
that the second emission path of the second point passes in proximity to the solid object without reflecting off the solid object; and receiving, from the model, second data representing the first characteristic associated with the solid object.

8. The method as recited in claim 5, wherein determining the second characteristic associated with the additional object comprises at least:
inputting first data into a model, the first data representing the percentage of sensor emissions that passed through the additional object unobstructed; and
receiving, from the model, second data representing the second characteristic associated with the additional object.

9. The method as recited in claim 1, wherein determining that the second point has the second emission path that passes in proximity to the solid object comprises at least:
inputting first data into a model, the first data representing at least:
a location associated with a sensor that generated the sensor data representing the second point, and
a location of the solid object within the environment; and
receiving, from the model, second data indicating that the second emission path of the second point passed in proximity to the solid object without reflecting off the solid object.

10. One or more non-transitory computer-readable media storing instructions that, when executed by one or more processors, cause the one or more processors to perform operations comprising:
receiving sensor data from one or more sensors of a vehicle;
determining, based at least in part on the sensor data, that a first point is reflected off a solid object, the first point being along a first direction of sensor emission;
determining, based at least in part on the sensor data, that a second point, associated with an additional object, is along an emission path that passes in proximity to the solid object without reflecting off the solid object, the emission path being along a second direction of sensor emission;
determining, based at least in part on the sensor data, a percentage of sensor emissions that pass through the additional object unobstructed, the emission path being associated with the percentage of sensor emissions;
determining a first characteristic associated with the solid object based at least in part on the first direction being within a threshold angle of the second direction;
determining, based at least in part on the percentage of sensor emissions, a second characteristic associated with the additional object, the second characteristic comprising a type of object; and
causing the vehicle to navigate based at least in part on the first characteristic or the second characteristic.

11. The one or more non-transitory computer-readable media as recited in claim 10, the operations further comprising:
determining that the emission path did not reflect off the solid object based on the second point being associated with the additional object.

12. The one or more non-transitory computer-readable media as recited in claim 10, the operations further comprising:
determining, based at least in part on the first point, an area within an environment at which the solid object is located; and
determining that the emission path passes through the area without reflecting off the solid object, and wherein determining the first characteristic associated with the solid object comprises determining a type associated with the solid object based at least in part on the emission path passing through the area without reflecting off the solid object.

13. The one or more non-transitory computer-readable media as recited in claim 10, wherein the sensor data is captured at a first time and the type of object comprises one of: solid, fog, or vehicle exhaust.

14. The one or more non-transitory computer-readable media as recited in claim 10, wherein determining the first characteristic associated with the solid object comprises determining an orientation associated with the solid object based at least in part on the first point and the emission path.

15. The one or more non-transitory computer-readable media as recited in claim 10, wherein determining the first characteristic associated with the solid object comprises at least:
  inputting first data into a model, the first data representing at least:
    the first point associated with the solid object, and
    that the emission path passes in proximity to the solid object without reflecting off the solid object; and
  receiving, from the model, second data representing the first characteristic associated with the solid object.

16. The system as recited in claim 1, the operations further comprising:
  determining that the second emission path did not reflect off the solid object based at least in part on the second point being associated with an additional object;
  determining, based on the sensor data, a percentage of sensor emissions that pass through the additional object unobstructed, the second emission path of the second point being associated with the percentage of sensor emissions; and
  determining, based at least in part on the percentage of sensor emissions, a second characteristic associated with the additional object comprising a type associated with the additional object.

* * * * *